(12) United States Patent
Short, Jr. et al.

(10) Patent No.: US 12,517,066 B1
(45) Date of Patent: Jan. 6, 2026

(54) RF-BASED MATERIAL DETECTION DEVICE THAT USES SPECIFIC ANTENNAS DESIGNED FOR SPECIFIC SUBSTANCES

(71) Applicant: QUANTUM IP, LLC, Stuart, FL (US)

(72) Inventors: Robert J. Short, Jr., Stuart, FL (US); Lee Duke, Stuart, FL (US)

(73) Assignee: QUANTUM IP, LLC, Stuart, FL (US)

( * ) Notice: Subject to any disclaimer, the term of this patent is extended or adjusted under 35 U.S.C. 154(b) by 0 days.

(21) Appl. No.: 18/921,840

(22) Filed: Oct. 21, 2024

Related U.S. Application Data

(60) Provisional application No. 63/667,556, filed on Jul. 3, 2024.

(51) Int. Cl.
| | | |
|---|---|---|
| *G01N 22/00* | (2006.01) | |
| *G01N 22/02* | (2006.01) | |
| *G01N 22/04* | (2006.01) | |
| *G01N 33/28* | (2006.01) | |
| *H01Q 1/22* | (2006.01) | |

(Continued)

(52) U.S. Cl.
CPC .............. *G01N 22/00* (2013.01); *G01N 22/02* (2013.01); *G01N 22/04* (2013.01); *H01Q 1/22* (2013.01); *H01Q 1/50* (2013.01); *H01Q 13/02* (2013.01); *G01N 33/2823* (2013.01); *H01Q 1/225* (2013.01)

(58) Field of Classification Search
CPC ........ G01N 22/00; G01N 22/04; G01N 22/02; G01N 33/2823; H01Q 1/50; H01Q 1/225; H01Q 13/02; H01Q 1/22
USPC ......................................................... 324/642
See application file for complete search history.

(56) References Cited

U.S. PATENT DOCUMENTS

| | | |
|---|---|---|
| 2,116,717 A | 5/1938 | Hans |
| 3,725,917 A | 4/1973 | Sletten et al. |

(Continued)

FOREIGN PATENT DOCUMENTS

| | | |
|---|---|---|
| CN | 107102325 | 8/2017 |
| CN | 117091456 | 11/2023 |

(Continued)

OTHER PUBLICATIONS

U.S. Appl. No. 18/922,682, US, Robert J. Short Jr., Enhanced Antenna Materials for Low-Frequency Detection of Materials, filed Oct. 22, 2024.

(Continued)

*Primary Examiner* — Raul J Rios Russo
(74) *Attorney, Agent, or Firm* — Polsinelli LLP

(57) ABSTRACT

An RF-based material detection device includes an antenna connector, a first interchangeable antenna capable of being releasably coupled to the RF-based material detection device via the antenna connector, an RF transmitter unit operably connected to the antenna connector and configured to transmit an RF signal via the first interchangeable antenna into a first material at a specific resonance frequency for the first material, and an RF receiver unit operably connected to the antenna connector and configured to receive from the first material via the first interchangeable antenna a first modified signal in response to interaction of the RF signal with the first material, wherein the first interchangeable antenna includes one or more design characteristics optimized to detect the first modified signal from the first material.

18 Claims, 5 Drawing Sheets

(51) Int. Cl.
*H01Q 1/50* (2006.01)
*H01Q 13/02* (2006.01)

(56) References Cited

U.S. PATENT DOCUMENTS

| | | |
|---|---|---|
| 3,851,971 A | 12/1974 | Koch |
| 3,983,558 A | 9/1976 | Rittenbach |
| 4,132,943 A | 1/1979 | Gournay et al. |
| 4,217,585 A | 8/1980 | Fishbein et al. |
| 4,296,378 A | 10/1981 | King |
| 4,514,691 A | 4/1985 | De Los Santos et al. |
| 4,897,660 A | 1/1990 | Gold et al. |
| 5,227,800 A | 7/1993 | Huguenin et al. |
| 5,233,300 A | 8/1993 | Buess et al. |
| 5,592,083 A | 1/1997 | Magnuson et al. |
| 5,745,071 A | 4/1998 | Blackmon et al. |
| 6,297,765 B1 | 10/2001 | Frazier et al. |
| 6,359,582 B1 | 3/2002 | MacAleese et al. |
| 6,900,633 B2 | 5/2005 | Sauer et al. |
| 6,967,612 B1 | 11/2005 | Gorman et al. |
| 7,251,310 B2 | 7/2007 | Smith |
| 7,288,927 B2 | 10/2007 | Nutting et al. |
| 7,405,692 B2 | 7/2008 | McMakin et al. |
| 7,825,648 B2 | 11/2010 | Nutting et al. |
| 8,138,770 B2 | 3/2012 | Pechmann et al. |
| 8,188,862 B1 | 5/2012 | Tam et al. |
| 8,242,447 B1 | 8/2012 | Chawla |
| 8,242,450 B2 | 8/2012 | Gaziano |
| 8,502,666 B1 | 8/2013 | Tam et al. |
| 8,773,127 B2 | 7/2014 | Apostolos et al. |
| 8,890,745 B2 | 11/2014 | Wahlquist et al. |
| 9,182,481 B2 | 11/2015 | Bowring et al. |
| 9,500,609 B1 | 11/2016 | Zank |
| 9,915,727 B1 | 3/2018 | Reznack et al. |
| 10,204,775 B2 | 2/2019 | Brown et al. |
| 10,229,328 B2 | 3/2019 | Nikolova et al. |
| 10,268,889 B2 | 4/2019 | Brown et al. |
| 10,816,658 B2 | 10/2020 | Frizzell |
| 10,890,656 B2 | 1/2021 | Heinen |
| 11,280,898 B2 | 3/2022 | Morton |
| 11,422,252 B2 | 8/2022 | Bowring et al. |
| 11,493,494 B2 | 11/2022 | Wilson et al. |
| 12,248,062 B1 | 3/2025 | Short et al. |
| 12,360,234 B1 | 7/2025 | Short et al. |
| 12,372,480 B1 | 7/2025 | Short et al. |
| 12,379,439 B1 | 8/2025 | Short et al. |
| 12,386,037 B1 | 8/2025 | Short et al. |
| 12,451,217 B1 | 10/2025 | Short, Jr. et al. |
| 12,455,332 B1 | 10/2025 | Short, Jr. et al. |
| 2002/0008655 A1 | 1/2002 | Haj-Yousef |
| 2003/0196543 A1 | 10/2003 | Moser et al. |
| 2004/0039713 A1 | 2/2004 | Beck |
| 2004/0125020 A1* | 7/2004 | Hendler ............... H01Q 21/30 |
| | | 343/846 |
| 2004/0155650 A1 | 8/2004 | Plaas-Link et al. |
| 2004/0232054 A1 | 11/2004 | Brown et al. |
| 2004/0252062 A1* | 12/2004 | Tracy ................. H01Q 9/0421 |
| | | 343/702 |
| 2005/0081634 A1 | 4/2005 | Matsuzawa |
| 2005/0200528 A1* | 9/2005 | Carrender ........... H01Q 9/0457 |
| | | 343/846 |
| 2005/0230604 A1 | 10/2005 | Rowe et al. |
| 2005/0258235 A1 | 11/2005 | Silverbrook et al. |
| 2006/0008001 A1 | 1/2006 | Heaton et al. |
| 2006/0038563 A1* | 2/2006 | Chisholm ............ G01R 33/441 |
| | | 324/309 |
| 2007/0074580 A1 | 4/2007 | Fallah-Rad et al. |
| 2007/0115183 A1* | 5/2007 | Kim ....................... H01Q 1/38 |
| | | 343/702 |
| 2007/0188377 A1 | 8/2007 | Krikorian et al. |
| 2008/0283761 A1 | 11/2008 | Robinson et al. |
| 2009/0085565 A1 | 4/2009 | Fullerton |
| 2009/0085582 A1* | 4/2009 | Sinha ...................... F16L 55/48 |
| | | 324/644 |
| 2009/0195435 A1 | 8/2009 | Kapilevich et al. |
| 2009/0262005 A1 | 10/2009 | McNeill et al. |
| 2010/0046704 A1 | 2/2010 | Song et al. |
| 2010/0079280 A1 | 4/2010 | Lacaze et al. |
| 2010/0128852 A1 | 5/2010 | Yamamoto et al. |
| 2010/0134102 A1 | 6/2010 | Crowley |
| 2010/0134254 A1 | 6/2010 | Kim |
| 2010/0164831 A1* | 7/2010 | Rentz .................... H01Q 9/42 |
| | | 343/848 |
| 2010/0182594 A1 | 7/2010 | Carron |
| 2011/0050241 A1 | 3/2011 | Nutting et al. |
| 2011/0233419 A1 | 9/2011 | Norris |
| 2011/0284742 A1 | 11/2011 | Barker et al. |
| 2012/0206141 A1 | 8/2012 | Apostolos et al. |
| 2012/0248313 A1 | 10/2012 | Karam et al. |
| 2012/0256779 A1 | 10/2012 | Nguyen et al. |
| 2014/0154788 A1 | 6/2014 | Omenetto et al. |
| 2015/0160181 A1 | 6/2015 | White et al. |
| 2016/0011307 A1 | 1/2016 | Casse et al. |
| 2016/0047757 A1 | 2/2016 | Kuznetsov et al. |
| 2016/0124071 A1 | 5/2016 | Baxley et al. |
| 2016/0166843 A1 | 6/2016 | Casse et al. |
| 2016/0178601 A1* | 6/2016 | Harrison ............... G01N 22/00 |
| | | 324/636 |
| 2016/0195608 A1 | 7/2016 | Ruenz |
| 2016/0223666 A1 | 8/2016 | Kim et al. |
| 2016/0274230 A1 | 9/2016 | Wu et al. |
| 2016/0327634 A1 | 11/2016 | Katz et al. |
| 2017/0011255 A1 | 1/2017 | Kaditz et al. |
| 2017/0350834 A1 | 12/2017 | Prado et al. |
| 2018/0067204 A1 | 3/2018 | Frizzell |
| 2018/0285640 A1 | 10/2018 | Brown et al. |
| 2019/0137653 A1 | 5/2019 | Starr et al. |
| 2019/0154439 A1 | 5/2019 | Binder |
| 2019/0208112 A1 | 7/2019 | Kleinbeck |
| 2019/0219687 A1 | 7/2019 | Baheti et al. |
| 2019/0257771 A1 | 8/2019 | Desmulliez et al. |
| 2020/0166634 A1 | 5/2020 | Peleg |
| 2020/0173970 A1 | 6/2020 | Wilson et al. |
| 2020/0264298 A1 | 8/2020 | Haseltine et al. |
| 2020/0333412 A1 | 10/2020 | Nichols et al. |
| 2020/0371227 A1 | 11/2020 | Malhi |
| 2021/0041376 A1 | 2/2021 | Ashiwal et al. |
| 2021/0096240 A1 | 4/2021 | Padmanabhan et al. |
| 2021/0312201 A1 | 10/2021 | Hastings et al. |
| 2021/0373098 A1 | 12/2021 | Fraundorfer et al. |
| 2022/0171017 A1 | 6/2022 | McFadden et al. |
| 2022/0265882 A1 | 8/2022 | Lemchen |
| 2022/0311135 A1 | 9/2022 | Guo et al. |
| 2022/0365168 A1 | 11/2022 | Amizur et al. |
| 2022/0408643 A1 | 12/2022 | Somarowthu et al. |
| 2023/0243761 A1 | 8/2023 | Somarowthu et al. |
| 2023/0375695 A1 | 11/2023 | Tan |
| 2024/0036166 A1 | 2/2024 | Geng et al. |
| 2024/0372600 A1 | 11/2024 | Schreck et al. |

FOREIGN PATENT DOCUMENTS

| | | |
|---|---|---|
| JP | 2014095625 | 5/2014 |
| WO | WO 2024091157 | 5/2024 |

OTHER PUBLICATIONS

U.S. Appl. No. 18/922,693, US, Robert J. Short Jr., Dynamic Phased Array Resonator Systems and Methods for Determining a Material Substance, filed Oct. 22, 2024.

U.S. Appl. No. 18/923,518, US, Robert J. Short Jr., Currency RF-Based Verification Device, filed Oct. 22, 2024.

U.S. Appl. No. 18/922,702, US, Robert J. Short Jr., Enhanced Material Detection and Frequency Sweep Analysis of Controlled Substances Via Digital Signal Processing, filed Oct. 22, 2024.

U.S. Appl. No. 18/922,729, US, Robert J. Short Jr., RF-Based Detection Device for Material Identification Using a Smart Frequency Selection Method, filed Oct. 22, 2024.

U.S. Appl. No. 18/929,189, US, Robert J. Short Jr., RF-Specific Material Detection Device for an Application-Specific Device, filed Oct. 28, 2024.

(56) References Cited

OTHER PUBLICATIONS

U.S. Appl. No. 18/782,964, US, Robert J. Short Jr., RF-Based Material Identification Systems and Methods, filed Jul. 24, 2024.
PCT/US2024/039348, WO, Robert J. Short, Jr., RF-Based Material Identification Systems and Methods, filed Jul. 24, 2024.
U.S. Appl. No. 18/934,569, US, Robert J. Short Jr., Networked RF Material Devices for Substance Detection Via Opposed Perimeter Sensors, filed Nov. 1, 2024.
U.S. Appl. No. 18/939,132, US, Robert J. Short Jr., RF Material Detection Device With Smart Scanning Multiple Axis Gimbal Integrated with Haptics, filed Nov. 6, 2024.
U.S. Appl. No. 18/938,584, US, Robert J. Short Jr., RF Transmit and Receiver Antenna Detector System, filed Nov. 6, 2024.
U.S. Appl. No. 18/936,177, US, Robert J. Short Jr., Method and System for Detecting and Quantifying Specific Substances, Elements, or Conditions Utilizing an AI Module, filed Nov. 4, 2024.
U.S. Appl. No. 18/942,906, US, Robert J. Short Jr., RF-Specific Material Detection Device Integrated Into Application-Specific Drone Device, filed Nov. 11, 2024.
U.S. Appl. No. 18/936,500, US, Robert J. Short Jr., RF-Based Special Material Detection System With Secure Multi-Dimensional Authentication, filed Nov. 4, 2024.
U.S. Appl. No. 18/938,691, US, Robert J. Short Jr., RF-Based AI Determination of Materials by Cycling Through Detection Patterns for Specific Applications, filed Nov. 6, 2024.
U.S. Appl. No. 18/946,014, US, Robert J. Short Jr., RF-Based Special Material Detection Securing Entry Points and Access, filed Nov. 13, 2024.
U.S. Appl. No. 18/922,693, Non-Final Office Action dated Nov. 26, 2024.
U.S. Appl. No. 18/922,729, Non-Final Office Action dated Dec. 16, 2024.
U.S. Appl. No. 18/929,189, Non-Final Office Action dated Jan. 24, 2025.
U.S. Appl. No. 18/782,964, Non-Final Office Action dated Dec. 6, 2024.
U.S. Appl. No. 18/939,132, Non-Final Office Action dated Dec. 26, 2024.
U.S. Appl. No. 18/936,177, Non-Final Office Action dated Jan. 21, 2025.
U.S. Appl. No. 18/936,500, Non-Final Office Action dated Dec. 23, 2024.
U.S. Appl. No. 18/946,014, Non-Final Office Action dated Jan. 16, 2025.
Erricolo et al., "Machine Learning in Electromagnetics: A Review and Some Perspectives for Future Research," 2019 International Conference on Electromagnetics in Advanced Applications (ICEAA), Granada, Spain, 2019, pp. 1377-1380, doi: 10.1109/ICEAA.2019.8879110.
Ibrahim et al., "A Subspace Signal Processing Technique for Concealed Weapons Detection," 2007 IEEE International Conference on Acoustics, Speech and Signal Processing—ICASSP '07, Honolulu, HI, USA, pp. II-401-II-404, doi: 10.1109/ICASSP.2007.366257, 2007.
Itozaki et al., "Nuclear Quadrupole Resonance for Explosive Detection," International Journal on Smart Sensing and Intelligent Systems, vol. 1, No. 3, Sep. 2008.
PCT Application No. PCT/US2024/039348, International Search Report and Written Opinion dated Oct. 17, 2024.
U.S. Appl. No. 18/922,693, Final Office Action dated Mar. 17, 2025.
U.S. Appl. No. 18/938,584, Non-Final Office Action dated Feb. 24, 2025.
U.S. Appl. No. 18/922,693, Non-Final Office Action dated Jun. 4, 2025.
U.S. Appl. No. 18/929,189, Final Office Action dated Jun. 23, 2025.
U.S. Appl. No. 19/268,204, Non-Final Office Action dated Aug. 13, 2025.
U.S. Appl. No. 19/279,049, Non-Final Office Action dated Aug. 22, 2025.
PCT Application No. PCT/US2025/036318, International Search Report and Written Opinion dated Aug. 26, 2025.
U.S. Appl. No. 18/946,014, Final Office Action dated Sep. 10, 2025.
U.S. Appl. No. 18/923,518, Non-Final Office Action dated Nov. 19, 2025.

\* cited by examiner

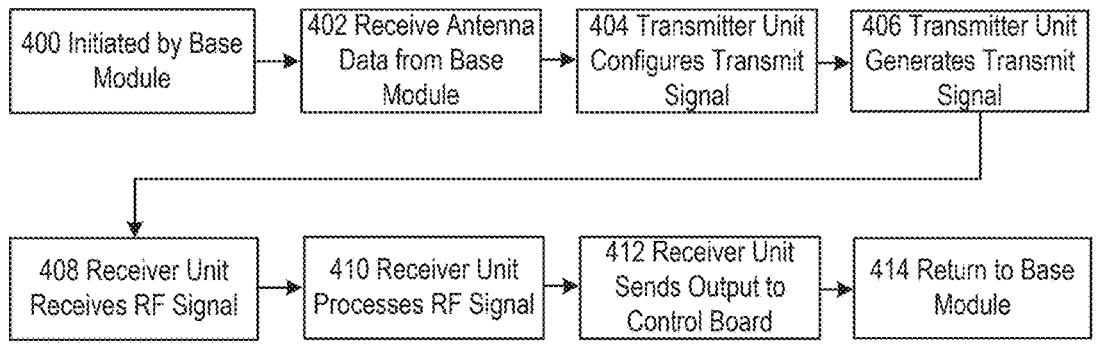
FIG. 4
| Antenna ID | Target Material | Data Packet |
|---|---|---|
| MA01-1234 | Gold | MA01-1234.data |
| MA02-9876 | Uranium | MA02-9876.data |
| - | - | - |
| - | - | - |
| - | - | - |
FIG. 5
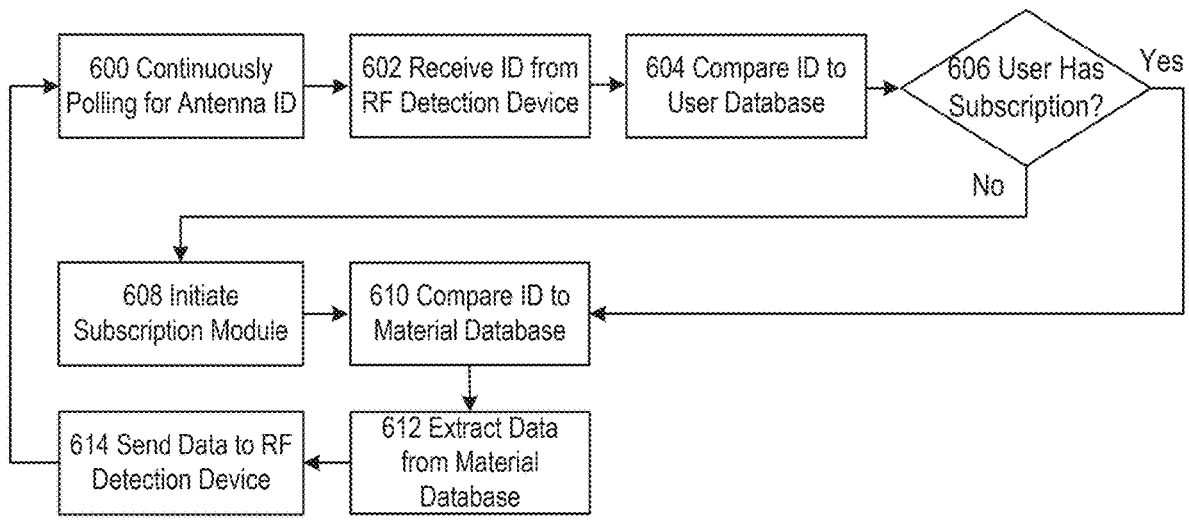
FIG. 6

| User ID | Subscription Plan | 1st Antenna ID | N Antenna ID |
|---|---|---|---|
| JS1234 | Basic | MA01-1234 | MA02-9876 |
| TB7989 | Premium | MA03-4567 | MA06-5467 |
| DB4567 | Basic | MA09-7632 | MA08-9271 |
| - | - | - | - |
| - | - | - | - |

| Antenna ID | Target Material | Data Packet |
|---|---|---|
| MA01-1234 | Gold | MA01-1234.data |
| MA02-9876 | Uranium | MA02-9876.data |
| MA03-4567 | Cocaine | MA03-4567.data |
| MA06-5467 | Anthrax | MA06-5467.data |
| - | - | - |

| Design Consideration | 50 Hz Antenna | 300 Hz Antenna |
|---|---|---|
| Wavelength | 6,000,000 meters | 1,000,000 meters |
| Antenna Type | Magnetic Loop / Inductive Coil | Magnetic Loop / Inductive Coil |
| Core Material | High permeability (e.g., ferrite) | High permeability (e.g., ferrite) |
| Number of Turns | ~45 turns | ~14 turns |
| Coil Diameter | 0.5 meters | 0.5 meters |
| Coil Length | 0.1 meters | 0.1 meters |
| Inductance | 10 H | 1 H |
| Capacitance | 10.1 μF | 0.28 μF |
| Impedance Matching | Matching network for high inductance | Matching network for moderate inductance |
| Grounding and Shielding | Required to minimize power line interference | Required to minimize RF noise |
| Physical Size | Large, due to long wavelength | More manageable than 50 Hz |
| Environmental Stability | High stability components required | High stability components required |
| Signal Loss Minimization | Critical due to long wavelength | Important but less critical than 50 Hz |
| Material Selection | Conductive materials with low resistance | Conductive materials with low resistance |
| Testing and Optimizing | Use antenna analyzer for 50 Hz | Use antenna analyzer for 300 Hz |

FIG. 10

RF-BASED MATERIAL DETECTION DEVICE THAT USES SPECIFIC ANTENNAS DESIGNED FOR SPECIFIC SUBSTANCES

CROSS-REFERENCE TO RELATED APPLICATIONS

This application claims the benefit of U.S. Provisional Application No. 63/667,556, filed Jul. 3, 2024, which is incorporated herein by reference.

FIELD OF THE DISCLOSURE

The present disclosure is generally related to material detection and, more specifically, to an RF-based material detection device that uses specific antennas designed for specific substances.

BACKGROUND

Currently, traditional detection systems often struggle with achieving high sensitivity and specificity for various materials due to fixed antenna designs that cannot be optimized for different targets. This leads to poor signal-to-noise ratios and unreliable detection results. Conventional detection devices are often limited by their static design, making them unsuitable for diverse field conditions and target materials. This lack of flexibility can hinder their effectiveness in varied applications, necessitating multiple devices for different tasks. Also, many detection systems require invasive methods to achieve reliable results, which can be time-consuming, costly, and pose risks to subjects or environments. Non-invasive techniques often suffer from insufficient accuracy and reliability. Upgrading traditional detection systems to improve their capabilities often involves complex modifications and significant expenses. This can be a barrier for many users, especially in resource-constrained settings. Fixed-antenna detection devices may yield inconsistent results when dealing with a variety of materials, as they cannot be optimized for each specific target. This inconsistency can lead to false positives or negatives, undermining the reliability of the system. Emerging threats, such as new drugs or novel cancer markers, require rapid adaptation of detection systems to remain effective. Traditional devices may not be able to quickly adapt to these new targets, leading to delays in detection and response. Thus, there is a need for an RF-based material detection device that overcomes the aforementioned problems.

SUMMARY

The present disclosure solves the problems of conventional approaches by providing an RF-based material detection device that uses specific antennas designed for detecting specific materials or substances. According to one aspect, an RF-based material detection device includes an antenna connector and a first interchangeable antenna capable of being releasably coupled to the RF-based material detection device via the antenna connector. The RF-based material detection device further includes an RF transmitter unit operably connected to the antenna connector and configured to transmit an RF signal via the first interchangeable antenna into a first material at a specific resonance frequency for the first material. The RF-based material detection device also includes an RF receiver unit operably connected to the antenna connector and configured to receive from the first material via the first interchangeable antenna a first modified signal in response to interaction of the RF signal with the first material. The first interchangeable antenna includes one or more design characteristics optimized to detect the first modified signal from the first material.

In some embodiments, the RF-based material detection device further includes a second interchangeable antenna capable, where the RF transmitter unit is configured to transmit an RF signal via the second interchangeable antenna into a second material at a specific resonance frequency for the second material, and the RF receiver unit is configured to receive from the second material via the second interchangeable antenna, a second modified signal in response to interaction of the RF signal with the second material. The second interchangeable antenna includes one or more design characteristics optimized to detect the second modified signal from the second material.

In some embodiments, the antenna connector is standardized to interface with respective connectors of the first interchangeable antenna and the second interchangeable antenna.

In some embodiments, the first interchangeable antenna and the second interchangeable antenna are each releasably coupled to the antenna connector at different times.

In some embodiments, the RF-based material detection device further includes a second antenna connector, where the second interchangeable antenna is releasably coupled to the second antenna connector.

In some embodiments, the one or more design characteristics include one or more of shape, physical dimensions, materials, and electrical properties.

In some embodiments, the one or more design characteristics are configured to optimize a signal-to-noise ratio for the first modified signal from the first material.

In some embodiments, the antenna connector includes a directional shield configured to block electromagnetic radiation in a specific direction.

In some embodiments, the RF transmitter unit is configured to select the specific resonance frequency for the RF signal based on a material database associating resonance frequencies with particular materials.

In some embodiments, the first interchangeable antenna is impedance matched with the RF transmitter unit and/or the RF receiver unit.

According to another aspect, an RF-based method for material detection includes releasably coupling a first interchangeable antenna to an antenna connector. The RF-based method for material detection also includes transmitting, via an RF transmitter unit operably connected to the first interchangeable antenna via the antenna connector, an RF signal into a first material at a specific resonance frequency for the first material. The RF-based method for material detection further includes receiving, from the first material via an RF receiver unit operably connected to the first interchangeable antenna by the antenna connector, a first modified signal in response to interaction of the RF signal with the first material. Transmitting includes optimizing one or more design characteristics of the first interchangeable antenna to detect the first modified signal from the first material.

In some embodiments, the RF-based method for material detection also includes transmitting, via the RF transmitter unit by a second interchangeable antenna, an RF signal into a second material at a specific resonance frequency for the second material and receiving, via the RF receiver unit by the second interchangeable antenna, a second modified signal in response to interaction of the RF signal with the second material, where the second interchangeable antenna includes one or more design characteristics optimized to detect the second modified signal from the second material.

In some embodiments, the antenna connector is standardized to interface with respective connectors of the first interchangeable antenna and the second interchangeable antenna.

In some embodiments, the first interchangeable antenna and the second interchangeable antenna are each releasably coupled to the antenna connector at different times.

In some embodiments, the RF-based method for material detection also includes releasably coupling the second interchangeable antenna to a second antenna connector.

In some embodiments, optimizing the one or more design characteristics of the first interchangeable antenna include optimizing one or more of shape, physical dimensions, materials, and electrical properties of the first interchangeable antenna.

In some embodiments, optimizing the one or more design characteristics of the first interchangeable antenna includes optimizing a signal-to-noise ratio for the first modified signal from the first material for the first interchangeable antenna.

In some embodiments, the RF-based method for material detection further includes configuring the antenna connector with a directional shield to block electromagnetic radiation in a specific direction.

In some embodiments, the RF-based method for material detection also includes configuring the RF transmitter unit to select the specific resonance frequency for the RF signal based on a material database associating resonance frequencies with particular materials.

In some embodiments, the RF-based method for material detection further includes impedance matching the first interchangeable antenna with the RF transmitter unit and/or the RF receiver unit.

BRIEF DESCRIPTION OF THE DRAWINGS

FIG. 4 is a flowchart of a method performed by a Detection Module, according to an embodiment.

FIG. 5 is a flowchart of a method performed by a Detection Database, according to an embodiment.

FIG. 6 is a flowchart of a method performed by a Handshake Module, according to an embodiment.

FIG. 10 is a flowchart of a method performed by an Example Embodiment of Two Modular Antennas, according to an embodiment.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
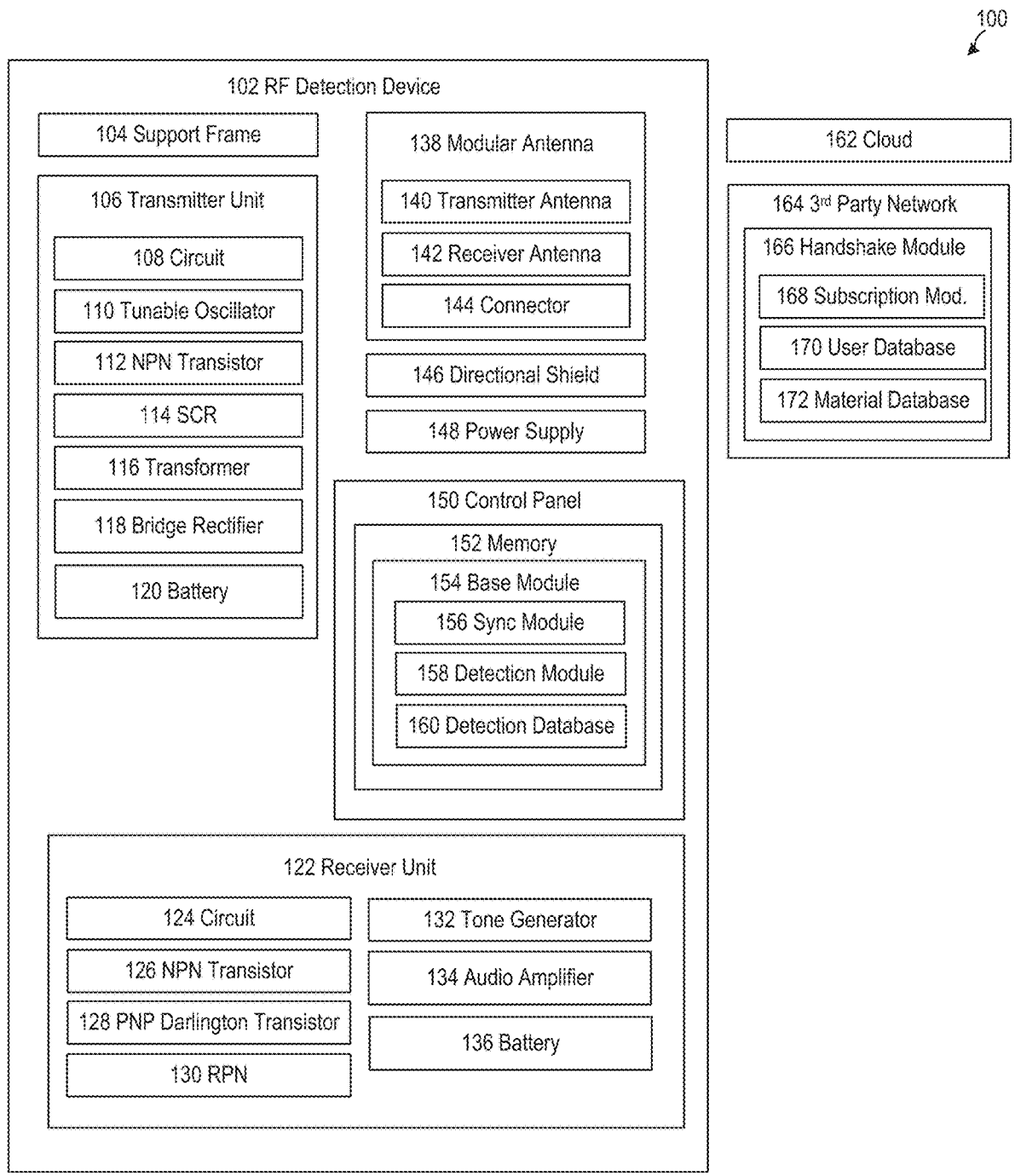
FIG. 1 is a schematic diagram of an RF Material Detection Device with Modular Antennas, according to an embodiment.

FIG. 1 illustrates a system 100 for RF material detection. This system 100 includes an RF detection device 102, which may be a specialized system designed to detect and identify specific materials based on their unique resonance frequencies when exposed to electromagnetic signals. The RF detection device 102 incorporates an RF detection system similar to that disclosed in patent U.S. Ser. No. 11/493,494B2, employing RF signals for the detection and identification of materials based on their resonance characteristics. The RF detection device 102 may operate by transmitting RF signals into the environment and analyzing the received signals for resonance characteristics that indicate the presence of a target material. The RF detection device 102 may be designed to detect a target material based on its resonance properties with specific RF frequencies. It utilizes the principle that materials resonate at particular frequencies when exposed to external RF signals, allowing for their identification and potential quantification. The RF detection device 102 may include a transmitter unit 106, a receiver unit 122, a control panel 150, a transmitter antenna 140, a receiver antenna 142, a directional shield 146, and a power supply 148. Upon activation, the control panel 150 initializes the system 100, powering up the transmitter unit 106, the receiver unit 122, and associated electronics. The control panel 150 may instruct the transmitter unit 106 to generate RF signals at specified frequencies, such as 180 Hz, 1800 Hz, etc., and amplitudes, such as 320V, 160V, etc., known to resonate with a target material. The transmitter unit 106 emits these RF signals through the transmit antenna 140 into the testing environment. The receiver unit 122 captures the RF signals using the receiver antenna 142. It then processes the received signals to identify resonance frequencies that indicate the presence of the target material.

Further, embodiments may include a support frame 104, which may be a structural component designed to provide stability and support to various subsystems and components of the RF detection device 102. The support frame 104 may provide proper alignment and positioning of the components, such as the transmitter unit 106, the receiver unit 122, antennas 140, 142, and control panel 150. The support frame 104 may provide mounting points and secure attachment locations for subsystems such as the transmitter unit 106, the receiver unit 122, antennas 140, 142, and control panel 150. By maintaining precise alignment and stability, the support frame 104 may minimize vibrations and unwanted movements that could interfere with the accuracy of RF signal transmission and reception. In some embodiments, the support frame 104 may be constructed from durable materials such as metal alloys or rigid polymers.

Further, embodiments may include a transmitter unit 106, which may include an electronic circuit 108, powered by a battery, such as a 12-volt, 1.2 amp battery, with a regulated output of nine volts. The circuit 108 may use a 555 timer as a tunable oscillator to generate a pulse rate. The output of the oscillator is fed in parallel to an NPN transistor 112 and a silicon-controlled rectifier (SCR) 114. The transistor may be used as a common emitter amplifier stage driving a transformer 116. The transformer 116 may be used to step up the voltage as needed. The balanced output of the transformer 116 feeds a bridge rectifier 118. The rectified direct current flows through a 100 K, three-watt resistor to terminal B of the transmitter antenna 140. A plurality of resistors and capacitors may fill in the circuit 108. In some embodiments, the transmitter antenna 140 may be formed from a coil of about 25 meters of 14-strand wire tightly wound around a one-centimeter PVC core. The transmitter antenna 140 may be, in one exemplary embodiment, in a 1"×3" configuration at the bottom end of the support frame 104. In some embodiments, the transmitter antenna 140 may be shielded approximately 315 degrees with the directional shield 146, formed from aluminum and copper, leaving a two-inch opening. Terminal A of the transmitter antenna 140 is switched to ground through the SCR 114. The SCR 114 is "fired" by the output of the 555 timer. This particular configuration generates a narrow pulsed waveform to the transmitter antenna 140 at a pulse rate as set by the 555 timer. Power is delivered through the 3 W resistor. Frequencies down to 4 Hz are achieved by an RC network containing a 100 K pot, a switch, and one of two capacitive paths. The circuit 108 may provide simple RC-controlled timing and deliver pulses to the primary of a step-up transformer 116, the output of which is full-wave rectified and fed to the transmitter antenna 140. The pulse rate is adjustable from the low Hz range to the low kHz range. The sharp pulses at low repetition frequencies yield a wide spectrum of closely spaced lines. The pulse rate is adjusted depending on the material to be detected. In some embodiments, one or more portions of the transmitter unit 106 may be implemented in an analog circuit configuration, a digital circuit configuration, or some combination thereof. In one example, the analog configuration may include one or more analog circuit components, such as, but not limited to, operational amplifiers, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate. In some embodiments, depending on the modular antenna's 138 requirements, such as frequency, power level, and waveform, the transmitter unit 106 can accommodate different configurations. For example, it may adjust parameters like frequency modulation to align precisely with the resonant frequency of the target material being detected by the antenna. In some embodiments, the transmitter unit 106 may also be modular, allowing for additional integration with different modular antennas 138.

Further, embodiments may include a circuit 108, which may be an assembly of electronic components that generate, modulate, and transmit radio frequency, RF, and signals. The circuit 108 may include oscillators, amplifiers, modulators, and other components that work together to produce a specific RF signal, which can then be transmitted through the transmitter antenna 140. The circuit 108 may include an oscillator, which generates a stable RF signal at a specified frequency. This frequency is selected based on the resonance characteristics of the target material. For example, the system 100 may operate at 180 Hz or 1800 Hz, depending on the specific requirements of the detection task. Once generated, the RF signal is fed into an amplifier. The amplifier boosts the signal strength to a level suitable for transmission over the required distance. This ensures that the signal can propagate through various media and reach the receiver unit effectively. Modulation circuits are used to encode information into the RF signal. This may involve varying the amplitude, frequency, or phase of the signal to carry specific data related to the detection process. Modulation ensures that the transmitted signal can be uniquely identified and distinguished from other signals in the environment. The circuit 108 may include power control components that regulate the voltage and current supplied to the oscillator and amplifier. This ensures consistent signal output and helps in managing the power consumption of the device. In some embodiments, the transmitter may operate at voltages such as 160V and 320V, with adjustments made to optimize detection performance. The amplified and modulated RF signal is then routed to the transmitter antenna 140. The transmitter antenna 140 converts the electrical signal into an electromagnetic wave that can propagate through the air or other media. In some embodiments, the circuit 108 may be integrated with the device's control systems, allowing for automated adjustments based on pre-set parameters or operator inputs.

Further, embodiments may include a tunable oscillator 110, which may be a type of electronic component that generates a periodic waveform with a frequency that can be adjusted or tuned over a specific range. The tunable oscillator 110 within the transmitter unit 106 may be utilized to generate the RF signal that will be transmitted by the RF detection device 102. The tunable oscillator 110 in the transmitter unit 106 may be employed to produce an RF signal whose frequency can be precisely controlled. By adjusting the control inputs, the frequency of the output signal can be varied, allowing the system 100 to adapt to different detection requirements and environmental conditions. This tuning mechanism may ensure that the oscillator produces a signal at the correct frequency needed for effective resonance with the target materials. By tuning the oscillator to specific frequencies, the system 100 may detect various substances based on their unique resonant properties. The tunable oscillator 110 may work in conjunction with the control panel 150, which sends control signals to adjust the oscillator's frequency as needed. The tunable oscillator 110 may act as the core signal generation component in the transmitter unit 106. When the control panel 150 determines the required frequency for detection, it sends control signals to the tunable oscillator 110. The oscillator then adjusts its frequency, accordingly, generating an RF signal that matches the desired parameters. The tunable oscillator 110 may be connected to other components within the transmitter unit 106, such as the SCR 114 and the transformer 116. The SCR 114 manages the power supply to the oscillator, ensuring it receives the correct voltage. The transformer 116 steps up the voltage to the appropriate level required by the oscillator.

Further, embodiments may include an NPN transistor 112, which may be a type of bipolar junction transistor, BJT, that consists of three layers of semiconductor material: a layer of p-type material, the base layer, sandwiched between two layers of n-type material, the emitter and the collector. When a small current flows into the base, it allows a larger current to flow from the collector to the emitter, effectively acting as a current amplifier or switch in electronic circuits. The NPN transistor 112 in the transmitter unit 106 amplifies the RF signal generated by the oscillator. The NPN transistor 112 may operate in its active region, where a small input current applied to the base controls a larger current flowing from the collector to the emitter. This amplification process ensures that the RF signal reaches a sufficient power level for effective transmission. In some embodiments, the NPN transistor 112 may also function as a switch, controlling the flow of current within the circuit 108. When the base-emitter junction is forward-biased, a small voltage is applied, and the NPN transistor 112 allows current to flow from the collector to the emitter. This switching action is used to modulate the RF signal, encoding information onto the carrier wave as required for the detection process. Proper biasing of the NPN transistor 112 is useful for stable operation. In some embodiments, resistors may be used to establish the correct biasing conditions to ensure that the NPN transistor 112 operates in its linear region for amplification or in saturation/cutoff regions for switching. The biasing circuit ensures that the NPN transistor 112 responds predictably to input signals, maintaining signal integrity. In some embodiments, the NPN transistor 112 may be involved in modulating the RF signal. By varying the input current to the base, the amplitude, frequency, or phase of the RF signal can be modulated. This modulation is critical for encoding the detection data onto the transmitted signal, allowing for accurate chemical identification and analysis. In some embodiments, the NPN transistor 112 may be integrated into the broader transmitter circuit 108, working in conjunction with other components such as capacitors, inductors, and resistors. This integration ensures that the NPN transistor's 112 amplification and switching actions are synchronized with the overall signal generation and transmission process. The circuit 108 design may leverage the NPN transistor's 112 properties to achieve the desired RF output characteristics.

Further, embodiments may include an SCR 114 or silicon-controlled rectifier, which may be a type of semiconductor device that functions as a switch and rectifier, allowing current to flow only when a control voltage is applied to its gate terminal. The silicon-controlled rectifier, SCR 114, is utilized within the transmitter unit 106 to manage and control the power delivery to the RF signal generation components. The SCR 114 in the transmitter unit 106 may be employed to control the flow of power to the RF oscillator circuit. By applying a gate signal to the SCR 114, it switches from a non-conductive state to a conductive state, allowing current to pass through and power the oscillator. This control mechanism ensures that the oscillator only receives power when required, thereby conserving energy and preventing unnecessary power dissipation. The SCR 114 may act as a switching element in the transmitter unit 106. When the control panel 150 determines that the RF signal needs to be generated, a gate voltage is applied to the SCR 114. This triggers the SCR 114 to conduct, completing the circuit and enabling current to flow to the RF oscillator. The SCR 114 may ensure that sufficient current is supplied to the oscillator to produce a strong RF signal without being damaged by the high power levels. The gate terminal of the SCR 114 may be connected to the control panel 150, which manages the timing and application of the gate signal. This integration ensures that the SCR 114 is activated precisely when the RF signal needs to be transmitted, in sync with the overall operation of the detection system 100. The control panel 150 sends the appropriate signal to the SCR 114, ensuring accurate timing and efficient power usage. The SCR 114 may also serve as a protective component in the transmitter unit 106. By controlling the power flow, it prevents overloading and potential damage to the RF oscillator and other sensitive components. If the system 100 detects any abnormal conditions, the control panel 150 can withhold the gate signal, keeping the SCR 114 in a non-conductive state and thereby cutting off power to protect the circuit.

Further, embodiments may include a transformer 116, which is an electrical device that transfers electrical energy between two or more circuits through electromagnetic induction. The transformer 116 is utilized within the transmitter unit 106 to manage and control the voltage levels required for the RF signal generation and transmission. The transformer 116 in the transmitter unit 106 may be employed to step up or down the voltage as needed to ensure the proper operation of the RF oscillator circuit. By adjusting the voltage levels, the transformer 116 ensures that the components within the transmitter unit receive the appropriate voltage for efficient functioning. The transformer 116 may act as a voltage regulation element in the transmitter unit 106. When the control panel 150 determines that the RF signal needs to be generated, the transformer 116 adjusts the input voltage to the desired level. This adjustment involves converting the primary winding voltage to a higher or lower voltage in the secondary winding, depending on the requirements of the RF oscillator. The transformer ensures that the oscillator receives a stable and appropriate voltage, which is critical for producing a consistent and strong RF signal. The primary winding of the transformer 116 may be connected to the power supply 148, while the secondary winding is connected to the RF oscillator circuit. This integration ensures that the transformer 116 can effectively manage the voltage levels needed for RF signal generation. The control panel 150 monitors and regulates the input voltage to the transformer 116, ensuring accurate and efficient voltage conversion and delivery to the RF oscillator.

Further, embodiments may include a bridge rectifier 118, which is an electrical device designed to convert alternating current, AC, to direct current, DC, using a combination of four diodes arranged in a bridge configuration. The bridge rectifier 118 is utilized within the transmitter unit 106 to ensure that the RF signal generation components receive a steady and reliable DC power supply. The bridge rectifier 118 in the transmitter unit 106 may be employed to convert the incoming AC voltage from the power supply into a DC voltage. By using all portions of the AC waveform, the bridge rectifier 118 provides full-wave rectification, resulting in a more efficient conversion process and producing a smoother and more stable DC output. The bridge rectifier 118 may act as a power conversion element in the transmitter unit 106. When the control panel 150 determines that the RF signal needs to be generated, the AC voltage supplied to the transmitter unit is passed through the bridge rectifier 118. The rectifier converts the AC voltage into a DC voltage by directing the positive and negative halves of the AC waveform through the appropriate diodes. This process results in a continuous DC voltage output that is used to power the RF oscillator and other critical components. The input terminals of the bridge rectifier 118 may be connected to the AC power supply, while the output terminals provide the rectified DC voltage to the RF oscillator circuit. This integration ensures that the bridge rectifier 118 can effectively convert and deliver the required DC power for RF signal generation. The control panel 150 monitors the output of the bridge rectifier, ensuring that the DC voltage is stable and within the desired range for optimal performance.

Further, embodiments may include a battery 120, which may be a type of energy storage device that provides a stable and portable power source for the transmitter unit 106. The battery 120 within the transmitter unit 106 may be utilized to supply the necessary electrical energy to the various components involved in generating and transmitting the RF signal. The battery 120 may be designed to store electrical energy and supply it to the respective components as required. The battery 120 may be rechargeable or replaceable cells capable of providing DC voltage. They are selected based on factors such as voltage output and capacity, which may be measured in ampere-hours, Ah, and size to meet the power requirements of each component effectively. In the transmitter unit 106, battery 120 may serve as a portable power source, enabling the generation and transmission of RF signals without requiring a direct connection to an external power supply. The battery 120 powers various components, such as the tunable oscillator 110, SCR 114, and transformer 116, ensuring continuous operation in various environmental conditions. In some embodiments, the battery 120 used may include lithium-ion, nickel-metal hydride, or other types suitable for portable electronic devices.

Further, embodiments may include a receiver unit 122, which may include the receiver circuit 124. Voltage from the receiver antenna 142 passes through a 10 K gain pot to an NPN transistor 126 used as a common emitter. The output is capacitively coupled to a PNP Darlington transistor 128. A plurality of resistors and capacitors fills in the circuit 124. The output is fed through an RPN 130 to a 555 timer that is used as a voltage-controlled oscillator. A received signal of a given amplitude generates an audible tone at a given frequency. In some embodiments, the output is fed to a tone generator, such as a speaker, via a standard audio amp. Sounds can be categorized as "grunts," "whines," and a particular form of whine with a higher harmonic notably present. In some embodiments, another indicator of a received signal is used, such as light, vibration, digital display, or analog display, in alternative to or in combination with the sound signal. A battery may be used to power the receiver circuit 124. The receiver circuit 124 may utilize a coherent, direct-conversion mixer, homodyne, with RF gain, yielding a baseband signal centered about DC. After a baseband gain stage, the baseband signal is fed to another timing circuit that functions as a voltage-controlled audio-frequency oscillator. The output of this oscillator is amplified and fed to a speaker. In some embodiments, one or more portions of the receiver unit 122 may be implemented in an analog circuit configuration, a digital circuit configuration, or some combination thereof. In one example, the analog configuration may include one or more analog circuit components, such as, but not limited to, operational amplifiers, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate. In some embodiments, the components of the receiver unit 122 may be selected or adjusted based on the characteristics of the modular antenna 138 to ensure optimal reception and accurate detection of the target material's resonance or response. The receiver unit 122 may also support variable gain control and digital signal processing techniques to enhance the signal-to-noise ratio and extract meaningful data from the received signals. In some embodiments, the receiver unit 122 may also be modular, allowing for additional integration with different modular antennas 138.

Further, embodiments may include a circuit 124 within the receiver unit 122, which may be an assembly of electrical components designed to process the received RF signal. The circuit 124 may accurately interpret the RF signals reflected or emitted from the target substances and convert them into data that can be analyzed by the RF detection device 102. The circuit 124 in the receiver unit 122 may be employed to handle signal amplification, filtering, demodulation, and signal processing. When an RF signal is received via the receiver antenna 142, it is typically weak and may contain noise or interference. The first stage of the circuit 124 may involve an amplifier that boosts the signal strength to a level suitable for further processing. This amplification ensures that even weak signals can be analyzed effectively. Next, the circuit 124 may include filtering components that serve to remove unwanted frequencies and noise from the received signal. Filters ensure that only the relevant frequency components of the RF signal are passed through, enhancing the signal-to-noise ratio and improving the clarity of the data. The circuit 124 may also incorporate a demodulator, which extracts the original information-bearing signal from the modulated RF carrier wave. This step interprets the data encoded in the RF signal, allowing the system 100 to identify specific characteristics or signatures of the target substances. In some embodiments, the circuit 124 may include various signal processing components, such as analog-to-digital converters, and ADCs, which convert the analog RF signal into digital data. This digital data may then be processed by the control panel 150 or other computational units within the system 100 for detailed analysis. The signal processing may involve algorithms to detect specific patterns, frequencies, or anomalies that indicate the presence of target materials. The components within the circuit 124 interact seamlessly to ensure accurate and efficient signal processing. For example, the amplified signal from the amplifier is passed to the filter, which cleans up the signal before it reaches the demodulator. The demodulated signal is then digitized by the ADC and sent to the control panel 150 for analysis.

Further, embodiments may include an NPN transistor 126, which may be a three-terminal semiconductor device used for amplification and switching of electrical signals. The NPN transistor 126 may consist of three layers of semiconductor material: a thin middle layer, or base, between two heavily doped layers, or emitter and collector. The NPN transistor operates by controlling the flow of current from the collector to the emitter, regulated by the voltage applied to the base terminal. The NPN transistor 126 integrated into the receiver unit 122 may be designed to process incoming RF signals and may operate in a configuration where the base-emitter junction is forward-biased by a small control voltage provided by preceding stages of the circuit. The collector of the NPN transistor 126 may be connected to the circuit's supply voltage through a load resistor. When a small current flows into the base terminal, it allows a larger current to flow from the collector to the emitter. This amplification process increases the strength of the received signal, enabling subsequent stages of the circuit to process it more effectively. In the receiver unit 122, the NPN transistor 126 may be employed within amplifier stages where signal gain is important. By controlling the base current, the circuit can modulate the transistor's conductivity and thereby regulate the amplification factor. This capability enhances weak RF signals received by the antenna and prepares them for further processing. In some embodiments, the NPN transistor 126 may be utilized in conjunction with capacitors and resistors to form amplifier circuits tailored to the specific requirements of the RF detection device 102. Capacitors may be used to couple AC signals while blocking DC components, ensuring that only the RF signal is amplified. Resistors set the biasing and operating points of the transistor, optimizing its performance within the circuit.

Further, embodiments may include a PNP Darlington transistor 128, which may be a semiconductor device consisting of two PNP transistors connected in a configuration that provides high current gain. The PNP Darlington transistor 128 integrates two stages of amplification in a single package, where the output of the first transistor acts as the input to the second, significantly boosting the overall gain of the circuit. The PNP Darlington transistor 128 amplifies weak RF signals received by the receiver antenna 142. The incoming RF signal is fed into the base of the first PNP transistor within the Darlington pair. The PNP Darlington transistor 128, due to its high current gain, allows a much larger current to flow from its collector to the emitter compared to the base current. The output from the collector of the first transistor serves as the input to the base of the second PNP transistor in the Darlington pair. The second PNP transistor further amplifies the signal received from the first stage, again with significant current gain.

Further, embodiments may include an RPN 130 or resistor potentiometer network, which may be an electrical circuit composed of resistors and potentiometers interconnected in a specific configuration to achieve desired electrical characteristics, such as voltage division, signal attenuation, or adjustment of resistance values. Potentiometers, also known as variable resistors, allow for manual adjustment of resistance within the circuit, while resistors set fixed values to control current flow and voltage levels. The RPN 130 in the receiver unit 122 may be configured to adjust signal levels received from the antenna and prepare them for further processing. This network consists of resistors and potentiometers connected to achieve precise voltage division and attenuation. By adjusting the potentiometers, operators can fine-tune the signal strength and impedance matching, optimizing signal quality for subsequent stages of signal processing. The RPN 130 ensures that incoming RF signals from the receiver antenna 142 are properly attenuated and scaled to match the input requirements of downstream electronics. This calibration process maintains signal integrity and fidelity throughout the reception and decoding process. In some embodiments, the potentiometers within the RPN 130 may allow for manual adjustment of signal parameters such as amplitude and impedance, enabling operators to optimize signal reception based on environmental conditions and operational requirements.

Further, embodiments may include a tone generator 132, which may be a type of electronic device that produces audio signals or tones to alert the user of specific conditions. The tone generator 132 within the receiver unit 122 is utilized to generate audible alerts when the detection system 100 identifies the presence of target materials. The tone generator 132 in the receiver unit 122 may be employed to create specific tones that serve as audible indicators for the user. By generating these tones, the tone generator 132 provides immediate feedback to the operator, signaling the detection of target materials in real time. The tone generator 132 may ensure that the operator is promptly informed of detections without needing to constantly monitor visual displays. The tone generator 132 produces distinct sounds that correspond to different detection events, making it easier for the operator to understand the system's status and respond accordingly. The tone generator 132 may act as a critical alerting component within the receiver unit 122. When the control panel 150 determines that the RF signal corresponds to a detected target material, it sends a signal to the tone generator 132. This triggers the tone generator 132 to produce a sound, alerting the operator to the detection event.

Further, embodiments may include an audio amplifier 134, which may be a type of electronic device designed to increase the amplitude of audio signals. The audio amplifier 134 within the receiver unit 122 may be utilized to boost the audio signals generated by the tone generator 132, ensuring that the output sound is sufficiently loud and clear for the operator to hear. The audio amplifier 134 in the receiver unit 122 may be employed to enhance the volume and clarity of the audio tones produced by the tone generator 132. By amplifying these audio signals, the audio amplifier 134 ensures that the operator receives audible alerts even in noisy environments, thus improving the overall effectiveness of the detection system 100. The audio amplifier 134 may act as an intermediary component between the tone generator 132 and the output device, such as a speaker. When the tone generator 132 produces an audio signal, this signal is sent to the audio amplifier 134. The amplifier then boosts the signal's power, making it strong enough to drive the speaker and produce an audible sound. The audio amplifier 134 is connected to other components within the receiver unit 122, including the tone generator 132 and the speaker. It receives the low-power audio signals from the tone generator 132 and amplifies them to a level suitable for driving the speaker.

Further, embodiments may include a battery 136, which may be a type of energy storage device that provides a stable and portable power source for the receiver unit 122. The battery 136 within the receiver unit 122 may be utilized to supply the necessary electrical energy to the various components involved in generating and transmitting the RF signal. The battery 136 may be designed to store electrical energy and supply it to the respective components as required. The battery 136 may be rechargeable or replaceable cells capable of providing DC voltage. They are selected based on factors such as voltage output and capacity, which may be measured in ampere-hours, Ah, and size to meet the power requirements of each component effectively. In the receiver unit 122, batteries provide the necessary electrical energy to receive and process RF signals detected by the antenna. The battery 136 may power components such as amplifiers, filters, and signal processing circuitry, enabling the device to analyze incoming RF signals and extract relevant information. In some embodiments, the battery 136 used may include lithium-ion, nickel-metal hydride, or other types suitable for portable electronic devices.

Further, embodiments may include a modular antenna 138, which may be a component of the RF detection device 102 designed to be easily interchangeable, allowing users to swap antennas tailored for detecting specific materials or molecular structures. The modular antenna 138 may be engineered to optimize the signal-to-noise ratio for particular targets by aligning its design and functionality with the resonant frequencies or other characteristic signals of those targets. This customization enhances the device's detection accuracy and operational flexibility, making it suitable for diverse applications, including medical diagnostics, substance identification, and security screening. The modular antenna 138 may provide a versatile and adaptable means to enhance the detection of specific substances or conditions. The modular antenna 138 may be constructed using high-quality materials that ensure durability and consistent performance. The modular antenna 138 may be designed to resonate at specific frequencies associated with the target materials. This resonance alignment is achieved through precise engineering of the antenna's physical dimensions, materials, and electrical properties. In some embodiments, the modular antenna's 138 length, width, and shape are designed to match the wavelengths of the RF signals used for detecting specific materials. For example, an antenna designed to detect cancer cells may be optimized to resonate at frequencies that correspond to the molecular structures of those cells. In some embodiments, the modular antenna 138 may be made from conductive materials, such as copper or silver, which offer excellent electrical conductivity and minimal signal loss. These materials are often coated with protective layers to prevent corrosion and enhance longevity. The primary function of the modular antenna 138 is to transmit and receive RF signals that interact with the target materials. When the RF detection device 102 is activated, the antenna emits a signal that propagates through the environment, interacts with the target material, and is subsequently received back by the antenna for analysis. The antenna converts electrical signals from the transmitter unit 106 into electromagnetic waves. These waves travel through the air, ground, or other media, interacting with the target materials. The antenna's design ensures that the transmitted signal is strong and focused, increasing the likelihood of detecting the target material. After the RF signal interacts with the target material, the antenna receives the modified signal. The interaction may cause changes in the signal's amplitude, frequency, or phase, which the antenna captures and converts back into electrical signals for the receiver unit 122. The antenna's sensitivity and specificity are optimized to detect even subtle changes in the signal caused by the target material. The modular antenna 138 may be easily swapped out with other antennas. This interchangeability is facilitated by standardized connectors 144 and mounting mechanisms that allow users to quickly and securely attach different antennas to the detection device. In some embodiments, the modular antenna 138 may be equipped with connectors 144 that conform to industry standards, ensuring compatibility with various detection devices. These connectors 144 provide secure electrical and mechanical connections, preventing signal loss or damage during operation. The modular antenna 138 may include mounting features that allow it to be easily attached and detached from the RF detection device 102. These mechanisms ensure that the antenna remains securely in place during use while allowing for quick changes when different targets need to be detected. In some embodiments, the transmitter unit 106 and receiver unit 122 may also be modular, allowing for additional integration with different modular antennas 138. By adjusting or swapping these units, the RF detection device 102 may be fine-tuned to maximize sensitivity, minimize interference, and optimize overall performance. In some embodiments, when a particular modular antenna 138 is connected for use, the transmitter unit 106 and receiver unit 122 are configured or adjusted accordingly. For example, if the modular antenna 138 operates at a lower frequency, like 50 Hz, the transmitter unit 106 might emphasize power amplification and precise frequency tuning, while the receiver unit 122 prioritizes low-noise reception and accurate signal demodulation. Conversely, for higher frequencies or different modulation schemes required by other modular antennas, these units can be adapted to suit those specific needs. In some embodiments, multiple connectors 144 may be provided, such that two or more modular antennas 138 may be coupled to the RF detection device 102 at the same time to respectively facilitate detection of two or more materials.

Further, embodiments may include a transmitter antenna 140, which may be a device that radiates radio frequency, RF, and signals generated by the transmitter unit 106 towards a target material. The transmitter antenna 140 may be designed to efficiently transmit the generated RF signals into the surrounding environment and ensure the signals reach the intended target with minimal loss. The transmitter antenna 140 may be responsible for the emission of RF signals necessary for detecting materials at a distance. In some embodiments, the transmitter antenna 140 may operate within a specific frequency range suitable for detecting the atomic structures and characteristics of the target materials. The frequency range may be determined by the system's requirements and the properties of the materials being detected. In some embodiments, the gain of the antenna may be a measure of its ability to direct the RF energy towards the target. Higher gain antennas focus the energy more effectively, resulting in stronger signal transmission over longer distances. The antenna gain may be optimized for the operational frequency range. In some embodiments, the radiation pattern of the transmitter antenna 140 describes the distribution of radiated energy in space. For effective material detection, the antenna may have a directional radiation pattern, concentrating the RF energy in a specific direction to enhance detection accuracy. In some embodiments, impedance matching between the transmitter antenna 140 and the transmitter unit 106 may maximize power transfer and minimize signal reflection. Proper impedance matching may ensure efficient operation and reduce losses in the transmission path. In some embodiments, the physical design of the transmitter antenna 140 may include configurations such as dipole, patch, or horn antennas, depending on factors such as frequency range, gain, and environmental conditions. In some embodiments, the transmitter antenna 140 may be integrated with the transmitter unit 106 and other system components through connectors and mounting structures to ensure stable and reliable operation, with considerations for minimizing interference and signal loss.

Further, embodiments may include a receiver antenna 142, which may be a device that captures the radio frequency, RF, and signals reflected from a target material. The receiver antenna 142 may be designed to efficiently receive the reflected RF signals and transmit them to the receiver unit 122 for further processing and analysis. The receiver antenna 142 may be responsible for capturing the RF signals that have interacted with the target material. In some embodiments, the receiver antenna 142 may be designed to operate within the same frequency range as the transmitter antenna 140 to ensure compatibility and optimal performance for detecting the atomic structures and characteristics of the target materials. In some embodiments, the sensitivity may be a measurement of the receiver antenna's 130 ability to detect weak signals. A highly sensitive receiver antenna 142 may detect low-power reflected signals, enhancing the system's detection capabilities. In some embodiments, the noise figure of the receiver antenna 142 may indicate the level of noise it introduces into the received signal. A lower noise figure may be desirable as it ensures that the captured signals are as clean and strong as possible for accurate processing. In some embodiments, proper impedance matching between the receiver antenna 142 and the receiver unit 122 may minimize signal reflection and maximize the power transfer from the antenna to the processing unit to ensure efficient and accurate signal reception. In some embodiments, the directional properties of the receiver antenna 142 may determine its ability to capture signals from specific directions to distinguish signals reflected from the target material versus other sources of interference. In some embodiments, the gain of the receiver antenna 142 may enhance its ability to receive signals from distant targets. Higher gain antennas can improve the system's ability to detect materials at greater distances. In some embodiments, the physical design of the receiver antenna 142 may include various configurations such as dipole, patch, or parabolic antennas and may be based on factors such as frequency range, gain, and specific detection requirements. In some embodiments, the receiver antenna 142 may be integrated with the receiver unit 122 and other system components through connectors and mounting structures to ensure stable and reliable operation, with considerations for minimizing interference and signal loss. In some embodiments, the receiver antenna 142 and the transmitter antenna 140 may be a single antenna used by the RF detection device 102.

Further, embodiments may include connectors 144, which may be used to connect the modular antenna 138 to the RF detection device 102 and may be standardized, high-quality interfaces designed to ensure secure and efficient electrical and mechanical connections. The connectors 144 may facilitate the easy interchangeability of antennas, allowing users to swiftly swap antennas for different detection tasks. The connectors 144 may be engineered to maintain signal integrity, minimize loss, and withstand environmental factors, ensuring reliable performance during the detection process. The connectors 144 may be robust and user-friendly, featuring locking mechanisms to prevent accidental disconnections and ensuring that the antenna remains firmly attached during operation.

Designing the connector 144 for an RF antenna at very low frequencies such as 182 Hz or 200 Hz presents specific challenges. Common RF connectors like BNC, N, and SMA, typically designed for higher frequencies, could be adapted for very low frequencies if mechanically suitable. Custom-designed connectors might be useful to ensure minimal signal loss and proper impedance matching. For example, the connector 144 and cable may have the same impedance (commonly 50 ohms) to minimize signal reflection and loss. If using an antenna with balanced impedance (like a dipole), a balun (balanced to unbalanced transformer) might be needed. High-quality, low-loss cables designed for audio or low-frequency signals may be utilized to minimize attenuation. Cables and connectors may be well-shielded to prevent interference from external sources. At low frequencies, wavelengths are very long (e.g., at 200 Hz, the wavelength is 1500 km). The physical size of the antenna system might be large, so the connector 144 may be capable of handling large cable sizes and mechanically stable. High-conductivity materials (like copper or silver-plated contacts) may be used to ensure low resistance and good signal transmission. The connector 144 may be durable and resistant to environmental factors if used outdoors. The connector 144 may provide good grounding to prevent noise and signal degradation. The connector 144 may be designed to minimize capacitive and inductive coupling with other components. Heavy-duty audio connectors (like XLR) could be adapted for low-frequency RF applications due to their ability to handle low-frequency signals. Connectors used in industrial applications (such as those for low-frequency industrial sensors) may be used, which may provide the necessary robustness and electrical characteristics. In some embodiments, a custom connector may be designed for low-frequency RF applications, such as 182 Hz or 200 Hz, which requires features suited for handling low frequencies, mechanical robustness, and environmental resistance. The housing of the connector 144 may be made from durable, weather-resistant materials like high-grade stainless steel or heavy-duty plastic with UV resistance for outdoor applications. Connectors could be cylindrical or rectangular to accommodate large cable sizes and larger than typical RF connectors to handle the physical size of low-frequency cables and provide mechanical stability. Connectors could incorporate rubber or silicone gaskets for moisture and dust resistance, ensuring an IP67 or higher rating for outdoor use. High-conductivity materials such as copper or silver-plated brass could be used to ensure minimal resistance and maximum signal integrity. Larger diameter pins may be used, which would handle higher currents typical of low-frequency signals, with potentially multiple contact points to ensure a connection. Contacts might be gold-plated to prevent oxidation and ensure long-term reliability. A cable clamping mechanism may be provided to secure large cables, with built-in strain relief to prevent damage to the cable and maintain a connection. The connector 144 may incorporate a 360-degree shielding termination to ensure complete electromagnetic shielding and minimizing interference. If the system 100 requires a transition between balanced and unbalanced lines, the connector 144 might include a built-in balun or transformer. A dedicated ground pin may ensure proper grounding and minimize noise, with a solid connection point for the cable's shield to the connector housing for effective grounding. A screw-type or bayonet locking mechanism may ensure a vibration-resistant connection, with an optional locking latch for additional security in high-vibration environments. Color-coded bands or inserts could be used to easily identify different connectors or signal types, with clear, durable markings for impedance, frequency range, and other relevant specifications. The connector 144 may be similar to an industrial connector used in heavy machinery or audio applications, but tailored for RF use. It could have a cylindrical body with a threaded coupling nut, approximately 2 inches in diameter and 4 inches long, made of stainless steel with a black anodized finish for corrosion resistance. The interior would have four silver-plated brass pins, each 0.25 inches in diameter, one additional ground pin, slightly larger, positioned centrally, and a high-grade plastic insulator holding the pins.

Further, embodiments may include a directional shield 146, which may be a physical barrier or enclosure designed to direct or block electromagnetic radiation in a specific direction. The directional shield 146 may be constructed from conductive materials such as metal to attenuate or reflect RF signals, thereby controlling the propagation of electromagnetic waves. The directional shield 146 may be positioned around the RF oscillator and antennas 140, 142 and may act as a physical barrier that prevents RF signals from propagating in undesired directions, thereby enhancing the precision and accuracy of signal transmission and reception. During operation, when the transmitter unit 106 generates an RF signal, the directional shield 146 helps to focus and channel this signal toward the intended detection area. By reducing signal dispersion and reflection, the directional shield 146 improves the efficiency of signal transmission and enhances the system's overall sensitivity to detecting RF reflections from underground objects or materials.

Further, embodiments may include a power supply 148, such as batteries serving as the power source for specific components within the RF detection device 102, including the control panel 150. These batteries are designed to store electrical energy and supply it to the respective components as required. The batteries in the control panel 150 may be rechargeable or replaceable cells capable of providing DC voltage. They are selected based on factors such as voltage output and capacity, which may be measured in ampere-hours, Ah, and size to meet the power requirements of each component effectively. In some embodiments, the control panel 150 relies on batteries to maintain functionality for user interface operations, data processing, and communication with other parts of the RF detection device 102. The batteries in the control panel 150 ensure that they remain operational during field use, supporting tasks such as signal monitoring, parameter adjustment, and data transmission. In some embodiments, the batteries used in these components may include lithium-ion, nickel-metal hydride, or other types suitable for portable electronic devices. They are integrated into the design to provide sufficient power capacity and longevity, allowing the RF detection device 102 to operate autonomously for extended periods between recharges or battery replacements.

Further, embodiments may include a control panel 150, which may be a centralized interface comprising electronic controls and displays. The control panel 150 may serve as the user-accessible interface for configuring, monitoring, and managing the RF detection device's 102 operational parameters and data output. In some embodiments, the control panel 150 may be designed to provide operators with intuitive access to control and monitor various aspects of the RF detection device 102. The control panel 150 may allow for the configuration of settings such as signal frequency, transmission power, receiver sensitivity, and signal processing algorithms. In some embodiments, operators may use the control panel 150 to initiate and terminate detection operations, adjust calibration settings, and troubleshoot operational issues. In some embodiments, the control panel 150 may include a graphical display screen or LED indicators to present real-time status information and measurement results. In some embodiments, input controls such as buttons, knobs, or touch-sensitive panels may enable operators to interact with the device, input commands, and navigate through menu options. The control panel 150 may interface directly with the internal electronics of the RF detection device 102, including the transmitter unit 106, the receiver unit 122, antennas 140, 142, and signal processing circuitry. Through electronic connections and communication protocols, the control panel 150 may send commands to adjust operational parameters and receive feedback and status updates from the device. In some embodiments, the control panel 150 may be mounted on the support frame 104 and may provide an operator with control of the RF detection device 102, including adjusting various settings and signaling the operator of a detected material. In some embodiments, a rechargeable battery may power the RF detection device 102, including the transmitter unit 106, the receiver unit 122, and the control panel 150. In some embodiments, multiple batteries may be used. In some embodiments, a tone generator, such as a speaker, may be mounted to the support frame 104 to provide audible signals to the operator for detecting target materials.

Further, embodiments may include a memory 152, which includes suitable logic, circuitry, and/or interfaces that may be configured to store a machine code and/or a computer program with at least one code section executable by a processor. Examples of implementation of the memory 152 may include, but are not limited to, Random Access Memory (RAM), Read Only Memory (ROM), Hard Disk Drive (HDD), and/or a Secure Digital (SD) card. Further, embodiments may include a base module 154, which continuously checks for a modular antenna 138 connection. Once the modular antenna 138 is connected, the base module receives its ID and compares it to the detection database 160 to determine if it is new. If it is a new antenna, the base module 154 initiates the sync module 156. If it is not new, the base module 154 extracts the relevant data from the detection database. Following this, the base module initiates the detection module 158. The base module then checks if the system 100 is still activated, and if so, it re-initiates the detection module. If the system 100 is not activated, the process ends. Further, embodiments may include a sync module 156, which is initiated by the base module 154. It receives the modular antenna 138 ID from the base module 154. The sync module 156 then connects to the 3rd party network 164 and sends the modular antenna 138 ID to fetch antenna material data. After receiving the modular antenna 138 material data, it stores this information in the detection database 160. Finally, the sync module 156 returns control to the base module 154. Further, embodiments may include a detection module 158, which is initiated by the base module 154 and is responsible for configuring and generating the RF signal through the transmitter unit 106. It interacts with the control panel 150 to set parameters such as frequency and amplitude necessary for detecting specific target materials. Once the RF signal is generated and transmitted via the transmit antenna 140, the detection module 158 monitors the receiver unit 122 for RF signal reception. Upon receiving the RF signal via the receiver antenna 142, the detection module 158 processes the signal to extract relevant data about the presence of target materials. This processed data is then sent to the control panel 150 for further analysis and decision-making. The detection module 158 operates iteratively as long as the system 100 remains activated, continuously polling and analyzing data to detect and identify target materials based on the received RF signals. Further, embodiments may include a detection database 160, which may contain information about target materials and their corresponding detection parameters that was downloaded from the 3rd party network 164. The detection database 160 may facilitate efficient management and retrieval of data useful for identifying and analyzing detected materials based on their electromagnetic responses. The detection database 160 may contain a modular antenna 138 ID, a target material or substance, and a data packet that contains the parameters for each of the modular antenna 138. Each modular antenna 138 deployed in the RF detection system 100 may be uniquely identified by an antenna ID, which links the modular antenna 138 to specific detection capabilities and configurations. The detection database 160 may categorize various substances and materials that the RF detection device 102 is designed to identify. In some embodiments, the substances and materials may include specific elements from the periodic table and other materials of interest, such as drugs, biohazardous substances, or specific molecular structures relevant to detection tasks. For example, the substances and materials may be gold, iron, copper, nitrogen-based compounds, explosive residues, drugs such as marijuana, cocaine, heroin, biological agents, cancerous tissues, etc. Each entry in the detection database 160 may include a data packet associated with the detected material. This packet contains detailed information about the material's electromagnetic characteristics, response patterns, and additional metadata such as file names or timestamps. For example, a data packet for gold may include resonance frequencies, signal strengths, and specific electromagnetic signatures characteristic of gold. A data packet for drugs may include spectral analysis results showing unique electromagnetic responses indicative of drug presence. In some embodiments, the detection database 160 may support the configuration and calibration of detection parameters based on the electromagnetic properties of target materials and allows for the optimization of detection algorithms and signal processing techniques tailored to specific substances. In some embodiments, the detection database 160 may be used in the base module 154, in which the antenna ID is used to extract the relevant target material parameters that are sent to the detection module 158 to identify the target material through the process described.

Further, embodiments may include a cloud 162 or communication network, which may be a wired and/or wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet, and relies on the sharing of resources to achieve coherence and economies of scale, like a public utility, while third-party clouds 162 enable organizations to focus on their core businesses instead of expending resources on computer infrastructure and maintenance. Further, embodiments may include a 3rd party network 164, which may be a digital platform that provides services for users and devices engaged in detecting specific materials using modular antennas 138. In some embodiments, the 3rd party network 164 may include functionalities for user authentication, subscription management, data provisioning, and the secure transmission of data packets necessary for the operation of the RF detection device 102. The 3rd party network 164 may be designed to support the operational requirements of the RF detection device 102 by offering a range of services and data management capabilities. In some embodiments, the 3rd party network 164 may serve as a centralized hub where users with valid subscriptions can access and download the necessary data packets to configure their modular antennas 138 for detecting specific materials or substances. In some embodiments, users may be identified by unique credentials stored in the user database 170 and may log into the 3rd party network 164 to manage their subscriptions and download relevant data. In some embodiments, the 3rd party network 164 may ensure that only authenticated users with active subscriptions can access the data packets, thereby maintaining the security and exclusivity of the service.

The 3rd party network 164 may capture and process a wide range of data used for RF-based substance detection. This may include raw RF data such as signal strength, frequency spectrum, phase shifts, and polarization changes, which are useful for detailed analysis and verification. It may also encompass processed data from initial on-site analysis, including identified resonant frequencies, backscatter patterns, and preliminary substance identification results. Environmental data, such as temperature, humidity, and potential sources of interference, may also be recorded. Location and context information may be gathered, including GPS coordinates of the scanned area, contextual details about the scanning site, and any notable features or obstacles. Device and scan metadata, such as the unique identifier for the scanning device, accurate timestamps for each scan, and operator information including credentials and authorization, may be logged. Detection results, such as specific substances detected, estimated concentration, and confidence levels of the identification, may be recorded along with any alerts or warnings generated by the system 100. Security and authentication data, including encryption keys and authentication tokens, may ensure secure data transmission and storage. Reporting and documentation may be facilitated through summarized reports of scan results and detailed analysis reports, possibly including expert review and confirmation. Secure data transfer protocols, like HTTPS, SFTP, or VPNs, may be used to ensure data integrity and confidentiality. The 3rd party network 164 may support real-time data transmission for critical applications and batch transfer for non-critical data to optimize bandwidth usage. For instance, at the USA border, detailed RF scan data and initial substance identification results may be transmitted to a central monitoring station or command center, along with geolocation and site information. Security measures may ensure encrypted and authenticated data transfer to prevent unauthorized access. On school property, detection results and alerts may be immediately transmitted to school security personnel and local law enforcement, with summarized scan results sent to the school administration. In a medical clinic, raw and processed scan data may be transmitted to medical professionals and specialists for further analysis, including contextual and environmental data and detailed analysis reports to the attending physician. Considerations for data transfer may include ensuring compliance with privacy laws like HIPAA for medical data, implementing measures to verify data integrity, minimizing latency for real-time applications, and using redundant data transfer paths and storage solutions to ensure data is not lost in transit. By carefully managing the data transfer process, the 3rd party network 164 may ensure secure, reliable transmission, enabling the effective utilization of RF-based substance detection results by relevant parties across different locations and applications. The 3rd party network 164 may include the processing and transmission of data packets that contain information about the target materials. These data packets are used by the modular antennas 138 to accurately detect various substances. For example, if a user intends to detect a specific element like gold, the 3rd party network 164 provides a data packet with detailed information about the resonant frequency and other relevant parameters necessary for the detection process. Similarly, for more complex materials such as hazardous substances or biological entities, the network supplies comprehensive data packets tailored to the specific detection requirements. Further, embodiments may include a handshake module 166, which begins by continuously polling for antenna IDs and receiving them from the RF detection device 102. Upon receiving an ID, it compares it against the user database 170 to check for subscription status. If the user lacks a subscription, the module initiates the subscription module 168. If the subscription is valid, it further checks the antenna ID against the material database 172 to extract relevant antenna data. This data is then sent back to the RF detection device 102, ensuring that only authorized antennas with valid subscriptions and material data are utilized in the detection process. Further, embodiments may include a subscription module 168, which may be initiated by the handshake module 166 within the 3rd party network 164. It facilitates user interaction with the 3rd party network 164 to manage subscription plans. The user logs in to the network, selects a subscription plan, and proceeds with payment. Upon receiving the payment, the module stores the subscription data in the user database 170. After completing these steps, the subscription module 168 returns control to the handshake module 166, ensuring that the user's subscription status is updated and validated for antenna access. Further, embodiments may include a user database 170, which may store information about users who subscribe to services related to antenna access and detection capabilities. The user database 170 maintains a structured repository of user profiles, enabling efficient management of subscription plans and user-specific configurations. The user database 170 may include a plurality of user IDs, which may allow each user to be uniquely identified and serve as the primary key for accessing and managing individual user records. The user database 170 may include a subscription plan for each user and categorize each user based on the level of access granted to modular antennas 138 and associated detection capabilities. In some embodiments, the subscription plans may vary from basic to premium tiers, each offering distinct privileges regarding the number and type of antennas accessible to the user. The user database 170 may include a plurality of modular antennas 138 that the user has registered to their subscription plan to ensure that the users have access to the appropriate data needed for detecting target materials effectively. In some embodiments, the user database 170 may support secure user authentication mechanisms, validating user credentials before granting access to detection functionalities and antenna resources. For example, a user with a Premium subscription plan may have access to multiple modular antennas 138 data that allows them to detect a broader range of target materials. Conversely, a user on a Basic plan may be limited to fewer antennas. The database dynamically adjusts access permissions based on the user's plan, ensuring efficient resource allocation and optimized detection capabilities. Further, embodiments may include a material database 172, which may contain information about target materials and their corresponding detection parameters. The material database 172 may facilitate efficient management and retrieval of data useful for identifying and analyzing detected materials based on their electromagnetic responses. The material database 172 may contain a modular antenna 138 ID, a target material or substance, and a data packet that contains the parameters for each of the modular antenna 138. Each modular antenna 138 deployed in the RF detection system 100 may be uniquely identified by an antenna ID, which links the modular antenna 138 to specific detection capabilities and configurations. The material database 172 may categorize various substances and materials that the RF detection device 102 is designed to identify. In some embodiments, the substances and materials may include specific elements from the periodic table and other materials of interest, such as drugs, biohazardous substances, or specific molecular structures relevant to detection tasks. For example, the substances and materials may be gold, iron, copper, nitrogen-based compounds, explosive residues, drugs such as marijuana, cocaine, heroin, biological agents, cancerous tissues, etc. Each entry in the material database 172 may include a data packet associated with the detected material. This packet contains detailed information about the material's electromagnetic characteristics, response patterns, and additional metadata such as file names or timestamps. For example, a data packet for gold may include resonance frequencies, signal strengths, and specific electromagnetic signatures characteristic of gold. A data packet for drugs may include spectral analysis results showing unique electromagnetic responses indicative of drug presence. In some embodiments, the material database 172 may support the configuration and calibration of detection parameters based on the electromagnetic properties of target materials and allow for the optimization of detection algorithms and signal-processing techniques tailored to specific substances. In some embodiments, the material database 172 may facilitate real-time updates and synchronization with the RF detection device 102, ensuring that new material profiles and detection methodologies are promptly integrated. In some embodiments, the material database 172 may serve as a repository for storing historical detection data and analysis results. In some embodiments, the material database 172 may include detection parameters uploaded by other users of the 3rd party network 164, allowing other members or users of the 3rd party network 164 to purchase and use the uploaded detection parameters for specific target materials.

In another embodiment, a material detection system uses a hybrid antenna that can operate both in RF-based and magnetic-based detection modes. This system is capable of switching between detecting materials based on their interaction with the RF field or the magnetic field, depending on the material being analyzed. In RF mode, the antenna transmits RF waves, and the system analyzes how the material reflects or absorbs these waves, providing information based on the dielectric constant or conductive properties of the material. In magnetic mode, the antenna focuses on the interaction between the material and the magnetic field component of the electromagnetic wave, allowing detection of materials with high magnetic permeability or strong magnetic responses. For example, the system could be used to detect metallic substances or magnetic compounds, such as those found in explosive materials, by optimizing the detection process based on which field interaction yields the clearest signature.

In yet another embodiment, a near-field material detection system uses a magnetic-based loop antenna that focuses on magnetic field interaction within close proximity to the target material. This system uses magnetic resonance principles, detecting changes in the magnetic field due to interactions with materials possessing magnetic susceptibility, such as ferromagnetic metals. The loop antenna generates a localized oscillating magnetic field, and when materials are introduced into the detection zone, they alter the field by inducing eddy currents or magnetic resonance effects. These changes are then measured to determine the material's properties. This method is particularly useful in applications such as industrial quality control or close-range security screening, where detecting the magnetic characteristics of a material offers clear advantages.

In still another embodiment, far-field magnetic resonance techniques are employed for material detection at greater distances. This system operates by transmitting an electromagnetic wave where the magnetic field component is emphasized, focusing on its interaction with materials that have resonant magnetic properties. By tuning the system to specific resonant frequencies, materials that exhibit strong magnetic responses, such as certain alloys or ferromagnetic materials, can be detected over a larger range. The detection system then analyzes the phase or amplitude of the reflected wave to infer material characteristics. This embodiment is particularly suitable for remote sensing applications, such as geological surveys, where materials can be identified based on their magnetic resonance even when located at a distance from the detection apparatus.

In other embodiments, an array of antennas is used to simultaneously detect materials based on both RF and magnetic field interactions. The antenna array consists of dipole antennas optimized for detecting the electric component of the RF wave and loop antennas that focus on the magnetic field interaction. These two types of signals are combined to create a composite material signature, allowing for detailed analysis of both the dielectric and magnetic properties of the material. By processing both electric and magnetic field data, the system can more accurately identify materials that exhibit a combination of electrical conductivity and magnetic permeability, such as advanced composites or stealth materials. This dual-mode system can be particularly useful in defense or aerospace applications.

In still other embodiments, a magnetic-based antenna system is designed for material detection in environments where RF signals would typically be degraded, such as underground or underwater. This system uses a loop antenna to generate a magnetic field that interacts with materials possessing strong magnetic properties, even in situations where RF signals are heavily attenuated. The antenna detects variations in the magnetic field caused by materials with high permeability, such as iron or nickel-based substances. This method allows for the detection of magnetic materials in conditions where RF detection would be unreliable, such as in deep-sea exploration or subterranean mining operations, where conventional RF signals would fail to penetrate effectively.

In further embodiments, a phased array system is designed specifically to manipulate the magnetic component of the electromagnetic wave for high-resolution material detection. A phased array of loop antennas is used to steer and focus the magnetic field, creating a directed magnetic beam that can scan across a target area. The system detects materials based on how they alter the magnetic field, allowing for precise location and identification of magnetic objects. By adjusting the phase and amplitude of each antenna element, the system provides a fine degree of control, enabling highly localized material detection. This approach is useful in situations requiring detailed spatial resolution, such as identifying hidden metallic objects in security screening or detailed inspections in industrial settings.

In additional embodiments, a portable or wearable material detection system is implemented using a small, magnetic-based loop antenna for detecting magnetic materials in close proximity. This compact system allows security personnel or industrial workers to move through different environments while continuously monitoring for materials that exhibit magnetic properties. The loop antenna generates a localized magnetic field and detects perturbations caused by nearby magnetic materials, such as concealed weapons or magnetic tags. The system then alerts the user when such materials are detected, making it ideal for field operations where mobility and ease of use are critical.

In yet another embodiment, the material detection system is entirely RF-based, using a highly optimized RF antenna to detect materials based solely on their interaction with the RF field. The RF antenna transmits electromagnetic waves at specific frequencies, and the system analyzes how these waves are reflected, absorbed, or scattered by the material. By focusing on the dielectric constant or conductive properties of the target material, the system can accurately identify substances such as explosives, chemicals, or other dielectric materials. This approach is particularly effective in environments where magnetic field-based detection is unnecessary or less effective. The RF-based system can be adapted for wide-ranging applications, from industrial material testing to security scanning, where detecting the electrical characteristics of the material is sufficient for identification.

Figure 2:
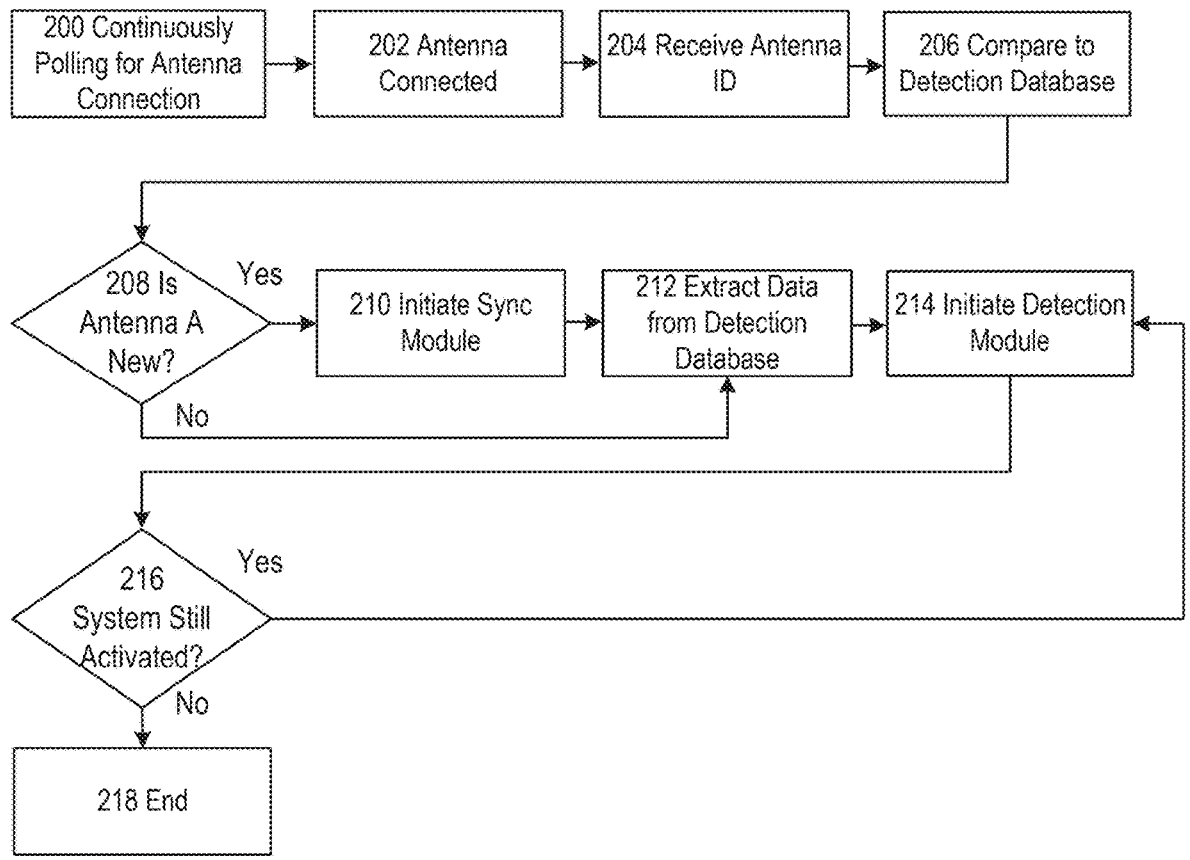
FIG. 2 is a flowchart of a method performed by a Base Module, according to an embodiment.

FIG. 2 illustrates the base module 154. The process begins with the base module 154 continuously polling at step 200 for a modular antenna 138 connection. In some embodiments, the base module 154 may be initiated once the system 100 is activated. In some embodiments, the base module 154 may be initiated once the modular antenna 138 is connected and sends the modular antenna 138 ID to the base module 154. The modular antenna 138 is connected at step 202. In some embodiments, the modular antenna 138 may be connected by the user by attaching and securing the modular antenna 138 to the RF detection device 102. The base module 154 receives, at step 204, the modular antenna 138 ID. In some embodiments, each modular antenna 138 may have a unique ID that is used to determine a specific set of parameters and/or settings that are stored in the detection database 160 and/or are downloaded from the 3rd party network 164. The modular antenna 138 ID may be used to extract or download the appropriate set of parameters and/or system settings to identify a specific target material or substance. The base module 154 compares, at step 206, the modular antenna 138 ID to the detection database 160. The base module 154 compares the modular antenna 138 ID to the detection database 160 to determine if the RF detection device 102 has previously downloaded the parameters and settings needed by the modular antenna 138 to identify the specific target material. The base module 154 determines, at step 208, if the modular antenna 138 is a new modular antenna 138. For example, if the modular antenna 138 data is stored in the detection database 160 the modular antenna 138 has been previously connected to the RF detection device 102 and downloaded the appropriate data packets to use the modular antenna 138. If the modular antenna 138 data is not stored in the detection database 160, then it may be determined that this is the first time the modular antenna 138 has been connected to the RF detection device 102. The base module 154 needs to initiate the sync module 156 to download the parameters and settings from the 3rd party network 164 to use the modular antenna 138 to identify the specific target material or substance. If it is determined that the modular antenna 138 is a new modular antenna 138 the base module 154 initiates, at step 210, the sync module 156.

For example, the sync module 156 may be initiated by the base module 154. It receives the modular antenna 138 ID from the base module 154. The sync module 156 then connects to the 3rd party network 164 and sends the modular antenna 138 ID to fetch antenna material data. After receiving the modular antenna 138 material data, it stores this information in the detection database 160. Finally, the sync module 156 returns control to the base module 154. If it is determined that the modular antenna 138 is not a new modular antenna 138, the base module 154 extracts, at step 212, the modular antenna 138 data from the detection database 160 and sends the extracted data to the detection module 156. The modular antenna 138 material data may include a data packet associated with the detected material. This packet contains detailed information about the material's electromagnetic characteristics, response patterns, and additional metadata such as file names or timestamps. For example, a data packet for gold may include resonance frequencies, signal strengths, and specific electromagnetic signatures characteristic of gold. A data packet for drugs may include spectral analysis results showing unique electromagnetic responses indicative of drug presence. The base module 154 initiates, at step 214, the detection module 158. For example, the detection module 158 may be initiated by the base module 154 and is responsible for configuring and generating the RF signal through the transmitter unit 106. It interacts with the control panel 150 to set parameters such as frequency and amplitude necessary for detecting specific target materials. Once the RF signal is generated and transmitted via the transmit antenna 140, the detection module 158 monitors the receiver unit 122 for RF signal reception. Upon receiving the RF signal via the receiver antenna 142, the detection module 158 processes the signal to extract relevant data about the presence of target materials. This processed data is then sent to the control panel 150 for further analysis and decision-making. The detection module 158 operates iteratively as long as the system 100 remains activated, continuously polling and analyzing data to detect and identify target materials based on the received RF signals. The base module 154 determines, at step 216, if the system 100 is still activated. If it is determined that the system 100 is still activated, the process returns to initiating the detection module 158. In some embodiments, the process may return to a modular antenna 138 being connected to the RF detection device 102. If it is determined that the system 100 is not activated, the base module 154 ends at step 218.

Figure 3:
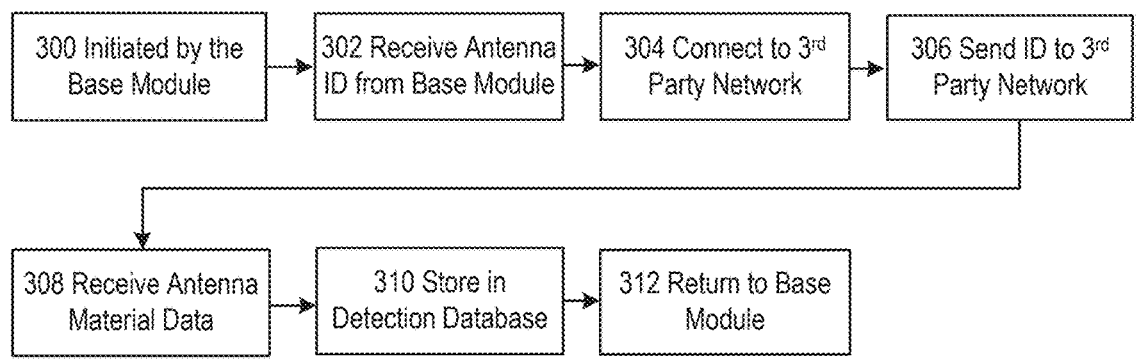
FIG. 3 is a flowchart of a method performed by a Sync Module, according to an embodiment.

FIG. 3 illustrates the sync module 156. The process begins with the sync module 156 being initiated at step 300 by the base module 154. In some embodiments, the sync module 156 may be initiated when a new modular antenna 138 is connected to the RF detection device 102 to download the necessary parameters and settings from the 3rd party network 164 to identify a specific target material through the modular antenna 138. The sync module 156 receives, at step 302, the antenna ID from the base module 154. In some embodiments, each modular antenna 138 may have a unique ID that is used to determine a specific set of parameters and/or settings that are downloaded from the 3rd party network 164. The modular antenna 138 ID may be used to download the appropriate set of parameters and/or system settings to identify a specific target material or substance. The sync module 156 connects, at step 304, to the 3rd party network 164. The 3rd party network 164 may be a digital platform that provides services for users and devices engaged in detecting specific materials using modular antennas 138. In some embodiments, the 3rd party network 164 may include functionalities for user authentication, subscription management, data provisioning, and the secure transmission of data packets necessary for the operation of the RF detection device 102. The 3rd party network 164 may be designed to support the operational requirements of the RF detection device 102 by offering a range of services and data management capabilities. The sync module 156 sends, at step 306, the antenna ID to the 3rd party network 164. The sync module 156 may send the modular antenna 138 ID to the 3rd party network 164 to receive and download the necessary data packets containing the parameters and settings, to use the modular antenna 138 to identify a specific target material. The sync module 156 receives, at step 308, the antenna material data. The modular antenna 138 material data may be a modular antenna 138 ID, a target material or substance, and a data packet that contains the parameters for each of the modular antenna 138. Each modular antenna 138 deployed in the RF detection system 100 may be uniquely identified by an antenna ID, which links the modular antenna 138 to specific detection capabilities and configurations. In some embodiments, the substances and materials may include specific elements from the periodic table and other materials of interest, such as drugs, biohazardous substances, or specific molecular structures relevant to detection tasks. For example, the substances and materials may be gold, iron, copper, nitrogen-based compounds, explosive residues, drugs such as marijuana, cocaine, heroin, biological agents, cancerous tissues, etc. Each entry in the material database 172 may include a data packet associated with the detected material. This packet contains detailed information about the material's electromagnetic characteristics, response patterns, and additional metadata such as file names or timestamps. For example, a data packet for gold may include resonance frequencies, signal strengths, and specific electromagnetic signatures characteristic of gold. A data packet for drugs may include spectral analysis results showing unique electromagnetic responses indicative of drug presence. The sync module 156 stores, at step 310, the antenna material data in the detection database 160. The detection database 160 may contain information about target materials and their corresponding detection parameters that was downloaded from the 3rd party network 164. The detection database 160 may facilitate efficient management and retrieval of data useful for identifying and analyzing detected materials based on their electromagnetic responses. The detection database 160 may contain a modular antenna 138 ID, a target material or substance, and a data packet that contains the parameters for each of the modular antenna 138. Each modular antenna 138 deployed in the RF detection system 100 may be uniquely identified by an antenna ID, which links the modular antenna 138 to specific detection capabilities and configurations. The detection database 160 may categorize various substances and materials that the RF detection device 102 is designed to identify. In some embodiments, the substances and materials may include specific elements from the periodic table and other materials of interest, such as drugs, biohazardous substances, or specific molecular structures relevant to detection tasks. For example, the substances and materials may be gold, iron, copper, nitrogen-based compounds, explosive residues, drugs such as marijuana, cocaine, heroin, biological agents, cancerous tissues, etc. Each entry in the detection database 160 may include a data packet associated with the detected material. This packet contains detailed information about the material's electromagnetic characteristics, response patterns, and additional metadata such as file names or timestamps. For example, a data packet for gold may include resonance frequencies, signal strengths, and specific electromagnetic signatures characteristic of gold. A data packet for drugs may include spectral analysis results showing unique electromagnetic responses indicative of drug presence. In some embodiments, the detection database 160 may support the configuration and calibration of detection parameters based on the electromagnetic properties of target materials and allows for the optimization of detection algorithms and signal processing techniques tailored to specific substances. In some embodiments, the detection database 160 may be used in the base module 154, in which the antenna ID is used to extract the relevant target material parameters that are sent to the detection module 158 to identify the target material through the process described. The sync module 156 returns, at step 312, to the base module 154.

FIG. 4 illustrates the detection module 158. The process begins with the detection module 158 being initiated at step 400 by the base module 154. In some embodiments, the detection module 158 may be initiated by the user or operator through the control panel 150. The detection module 158 receives, at step 402, the antenna data from the base module 154. The detection module 158 receives the modular antenna 138 data packet from the base module 154, which may include detailed information about the material's electromagnetic characteristics, response patterns, and additional metadata such as file names or timestamps. For example, a data packet for gold may include resonance frequencies, signal strengths, and specific electromagnetic signatures characteristic of gold. A data packet for drugs may include spectral analysis results showing unique electromagnetic responses indicative of drug presence. The detection module 158 commands, at step 404, the transmitter unit 106 to configure the transmit signal. The transmitter unit 106 prepares the signal that will be transmitted to detect a target material. In some embodiments, the parameters and components may be set up with the desired characteristics to generate the RF signal. The control panel 150 determines the specific parameters of the RF signal that need to be generated. The parameters may include the frequency, amplitude, and modulation type required to effectively detect the target materials. Once the parameters are set, the control panel 150 sends a command to activate the oscillator circuit within the transmitter unit 106. The oscillator circuit may be responsible for generating a stable RF signal at the desired frequency and may consist of components like capacitors, inductors, and amplifiers that work together to create the oscillating signal. The power delivery to the oscillator circuit may be managed by the SCR 114. When the control panel 150 sends a gate signal to the SCR 114, it switches from a non-conductive to a conductive state, allowing current from the power source, such as batteries, to flow to the oscillator circuit. After the oscillator circuit generates the RF signal, the transformer 116 adjusts the voltage level of the signal to match the requirements of the transmit antenna 140. It may also provide impedance matching to ensure efficient signal transmission. The transformer 116 ensures that the RF signal is at the appropriate voltage and current levels for optimal transmission. For example, the control panel 150 may determine that an RF signal with a frequency of 50 Hz is required to detect a specific material. It sends a command to the transmitter unit 106 to configure this signal. The oscillator circuit is activated, generating an RF signal at 50 Hz. The SCR 114 is triggered, allowing power from the batteries to flow to the oscillator circuit. The generated signal is then conditioned by the transformer 116, ensuring it is at the correct voltage level for transmission. In some embodiments, depending on the modular antenna's 138 requirements, such as frequency, power level, and waveform, the transmitter unit 106 can accommodate different configurations. For example, it may adjust parameters like frequency modulation to align precisely with the resonant frequency of the target material being detected by the antenna. In some embodiments, the transmitter unit 106 may also be modular, allowing for additional integration with different modular antennas 138. The detection module 158 commands, at step 406, the transmitter unit 106 to generate the transmit signal via the transmit antenna 140. The transmitter unit 106 generates the RF signal and transmits it through the transmit antenna 140 by converting electrical energy into radio waves that can be used for detecting specific materials. The transmit antenna 140 radiates the RF signal into the environment. The radio waves propagate through the medium, such as air or ground, and interact with the target materials. The interaction between the RF signal and the target materials will produce detectable changes in the signal, which can be received and analyzed by the receiver unit 122. For example, the transmitter unit 106 generates a wave pulse at a specified frequency that is transmitted directionally into the ground. The generated frequency is closely approximate or exact to that of the target material, and that relationship creates a responsive RF wave and/or a magnetic line between the transmitter antenna 140 and the target. When the RF detection device 102 is aligned with a target material, for example, when the opening of the directional shield 146 is pointing toward the target material, the voltage produced by the receiver antenna 142 changes and thereby produces a detection output signal, such as an audio signal having a tone different than that of the baseline. A reflective wave is produced by the target material that amplifies, resonates, offsets, or otherwise modifies the magnetic field passing through the receiver antenna 142 to alter the voltage produced, thereby generating the output signal. The receiver antenna 142 is responding to a voltage increase from the transmitter antenna 140 swinging over the magnetic line to the material. The detection module commands, at step 408, the receiver unit 122 to receive an RF signal via receiver antenna 142. The receiver unit 122 captures the RF signal that has interacted with the environment and potential target materials using the receiver antenna 142. The receiver antenna 142 captures the incoming RF signal, which has been transmitted by the transmitter unit 106 and has interacted with the environment and any target materials present. The receiver antenna 142 may be designed to effectively capture these radio waves and convert them back into electrical signals. Once the RF signal is received by the antenna, it may be fed into an RF amplifier, which boosts the signal strength without significantly altering its characteristics. In some embodiments, the use of the standard atomic structure of a material may be used to calculate the resonant frequency to which a particular substance would generate or respond. Each element and compound includes a definable atomic structure composed of the total number of protons and neutrons of that target material. This unique nuclear composition of every substance makes it uniquely identifiable and detectable. The manner in which this information is applied thus enables the detection of any target substance. A target material can be detected and located based on a resonant, responsive RF wave and/or magnetic relationship between the target and a transmitter antenna 140 transmitting at a frequency specific and unique to the target material. The transmitter unit 106, through the transmitter antenna 140, induces a resonance due to responsive RF waves and/or magnetic and/or otherwise in a targeted material to resonate at a specific computed frequency. The receiver antenna 142 and receiver circuit 124 detect the resonance induced in the material and, in so doing, indicate the approximate line of bearing to the material. The primary method used by this detection system 100 to detect specific materials is based on tuning the circuit 108 of the transmitter unit 106 to a specific value that is computed for the material of interest. The frequency can be based on any of the three defining characteristics of the substance, the number of protons, the number of neutrons, or the atomic mass, such as the sum of protons and neutrons and combinations thereof. The frequency can be transmitted at varying voltages to compensate for other external effects or interference. In some embodiments, a table or database of characteristics of common materials may be used to calculate the resonant frequencies. To accomplish this tuning, the frequency of the signal from the transmitter antenna 140 is set to some harmonic of the elements of the material. The detection module 158 commands, at step 410, the receiver unit 122 to process the RF signal. The receiver unit 122 processes the received RF signal to extract meaningful data that can be analyzed for the presence of specific materials, which may involve further amplification, filtering, digitization, and initial data processing before the signal is sent to the control panel 150 for detailed analysis. In some embodiments, after the RF signal is received and initially amplified, it may require further amplification to ensure the signal is at an optimal level for processing. In some embodiments, an additional RF amplifier within the receiver unit 122 may boost the signal strength while maintaining its integrity. The amplified signal may be subjected to more advanced filtering by the filter circuit, which removes any residual noise and unwanted frequencies that might have passed through the initial filtering stage. In some embodiments, the filtering may involve bandpass filters that allow only the desired frequency range to pass through. The filtered analog signal may be converted into a digital format using an Analog-to-Digital Converter, ADC. The ADC samples the analog signal at a high rate and converts it into a series of digital values. The digitized signal may be processed using digital techniques. The digital signal may be fed into a Digital Signal Processor, DSP, within the receiver unit 122. In some embodiments, the DSP may perform initial data processing tasks such as demodulation, noise reduction, and feature extraction. Demodulation involves extracting the original information-bearing signal from the carrier wave. Noise reduction techniques may further clean the signal, making it easier to analyze. Feature extraction may involve identifying characteristics of the signal that are indicative of the presence of target materials. In some embodiments, the components of the receiver unit 122 may be selected or adjusted based on the characteristics of the modular antenna 138 to ensure optimal reception and accurate detection of the target material's resonance or response. The receiver unit 122 may also support variable gain control and digital signal processing techniques to enhance the signal-to-noise ratio and extract meaningful data from the received signals. In some embodiments, the receiver unit 122 may also be modular, allowing for additional integration with different modular antennas 138. The detection module commands, at step 412, the receiver unit 122 to send the output to the control panel 150. The receiver unit 122 transmits the processed data to the control panel 150 for further analysis and decision-making, which may involve packaging the data in a suitable format, establishing a communication link, and ensuring the accurate and secure transmission of the data from the receiver unit to the control panel. The resultant data from the DSP process is organized and packaged, which may involve structuring the data into packets, adding metadata such as timestamps and identifiers, and incorporating error-checking codes to ensure data integrity during transmission. The receiver unit 122 may establish a communication link with the control panel 150 through wired connections, such as coaxial cables, or wireless communication protocols, such as Wi-Fi, Bluetooth, etc. The receiver unit 122 sends the packaged data over the established communication link. In some embodiments, the digital data packets may be converted into a format suitable for transmission over the communication link. In some embodiments, the control panel 150 receives the transmitted data packets and may demodulate the incoming signals, if wireless, and reconstruct the original data packets. In some embodiments, the control panel 150 may perform error-checking using the codes embedded in the packets to ensure that the data has been transmitted accurately and without corruption. In some embodiments, the control panel 150 may use algorithms and stored profiles of target materials to analyze the received data. In some embodiments, the control panel 150 may make decisions based on the analysis regarding the presence of target materials. In some embodiments, the control panel 150 may trigger alerts, log the detection event, or initiate further actions as required by the detection system's operational protocol. The detection module 158 returns, at step 414, to the base module 154.

FIG. 5 illustrates the detection database 160. The detection database 160 may contain information about target materials and their corresponding detection parameters that was downloaded from the 3rd party network 164. The detection database 160 may facilitate efficient management and retrieval of data useful for identifying and analyzing detected materials based on their electromagnetic responses. The detection database 160 may contain a modular antenna 138 ID, a target material or substance, and a data packet that contains the parameters for each of the modular antenna 138. Each modular antenna 138 deployed in the RF detection system 100 may be uniquely identified by an antenna ID, which links the modular antenna 138 to specific detection capabilities and configurations. The detection database 160 may categorize various substances and materials that the RF detection device 102 is designed to identify. In some embodiments, the substances and materials may include specific elements from the periodic table and other materials of interest, such as drugs, biohazardous substances, or specific molecular structures relevant to detection tasks. For example, the substances and materials may be gold, iron, copper, nitrogen-based compounds, explosive residues, drugs such as marijuana, cocaine, heroin, biological agents, cancerous tissues, etc. Each entry in the detection database 160 may include a data packet associated with the detected material. This packet contains detailed information about the material's electromagnetic characteristics, response patterns, and additional metadata such as file names or timestamps. For example, a data packet for gold may include resonance frequencies, signal strengths, and specific electromagnetic signatures characteristic of gold. A data packet for drugs may include spectral analysis results showing unique electromagnetic responses indicative of drug presence. In some embodiments, the detection database 160 may support the configuration and calibration of detection parameters based on the electromagnetic properties of target materials and allows for the optimization of detection algorithms and signal processing techniques tailored to specific substances. In some embodiments, the detection database 160 may be used in the base module 154, in which the antenna ID is used to extract the relevant target material parameters that are sent to the detection module 158 to identify the target material through the process described.

FIG. 6 illustrates the handshake module 166. The process begins with the handshake module 166 continuously polling, at step 600, for the antenna ID from the RF detection device 102. In some embodiments, the handshake module 166 may receive additional data from the RF detection device 102, such as a user ID that is associated with the RF detection device 102 and a current user subscription. The handshake module 166 receives, at step 602, the antenna ID from the RF detection device 102. The handshake module 166 receives the modular antenna 138 unique ID from the RF detection device 102 that is used to identify the modular antenna 138's specific parameters and settings used to identify a specific target material. The handshake module 166 compares, at step 604, the ID to the user database 170. The user database 170 may include a plurality of user IDs, which may allow each user to be uniquely identified and serve as the primary key for accessing and managing individual user records. The user database 170 may include a subscription plan for each user and categorize each user based on the level of access granted to modular antennas 138 and associated detection capabilities. The handshake module 166 determines, at step 606, if the user has a subscription for the antenna. For example, the handshake module 166 may determine if the user ID and modular antenna 138 ID are currently under subscription, which would allow the user to download the modular antenna 138 data packet to use the modular antenna 138 on the RF detection device 102. If it is determined that the user does not have a subscription for the antenna then the handshake module 166 initiates, at step 608, the subscription module 168. The subscription module 168 may be initiated by the handshake module 166 within the 3rd party network 164. It facilitates user interaction with the 3rd party network 164 to manage subscription plans. The user logs in to the network, selects a subscription plan, and proceeds with payment. Upon receiving the payment, the module stores the subscription data in the user database 170. After completing these steps, the subscription module 168 returns control to the handshake module 166, ensuring that the user's subscription status is updated and validated for antenna access. If it is determined that the user has a subscription for the antenna, the handshake module 166 compares, at step 610, the antenna ID to the material database 172. The handshake module 166 compares the modular antenna 138 ID to identify the corresponding data entry in the material database 172 that contains the data packet for the modular antenna 138. The handshake module 166 extracts, at step 612, the antenna data from the material database 172. The modular antenna 138 material data may be a modular antenna 138 ID, a target material or substance, and a data packet that contains the parameters for each of the modular antenna 138. Each modular antenna 138 deployed in the RF detection system 100 may be uniquely identified by an antenna ID, which links the modular antenna 138 to specific detection capabilities and configurations. In some embodiments, the substances and materials may include specific elements from the periodic table and other materials of interest, such as drugs, biohazardous substances, or specific molecular structures relevant to detection tasks. For example, the substances and materials may be gold, iron, copper, nitrogen-based compounds, explosive residues, drugs such as marijuana, cocaine, heroin, biological agents, cancerous tissues, etc. Each entry in the material database 172 may include a data packet associated with the detected material. This packet contains detailed information about the material's electromagnetic characteristics, response patterns, and additional metadata such as file names or timestamps. For example, a data packet for gold may include resonance frequencies, signal strengths, and specific electromagnetic signatures characteristic of gold. A data packet for drugs may include spectral analysis results showing unique electromagnetic responses indicative of drug presence. The handshake module 166 sends, at step 614, the antenna data to the RF detection device 102 and returns to continuous polling to receive the modular antenna 138 ID. The handshake module 166 sends the modular antenna 138 data packet to the sync module 156, allowing the RF detection device 102 to use the necessary parameters and settings the modular antenna 138 needs to identify a specific target material or substance.

Figures 7, 8, 9:
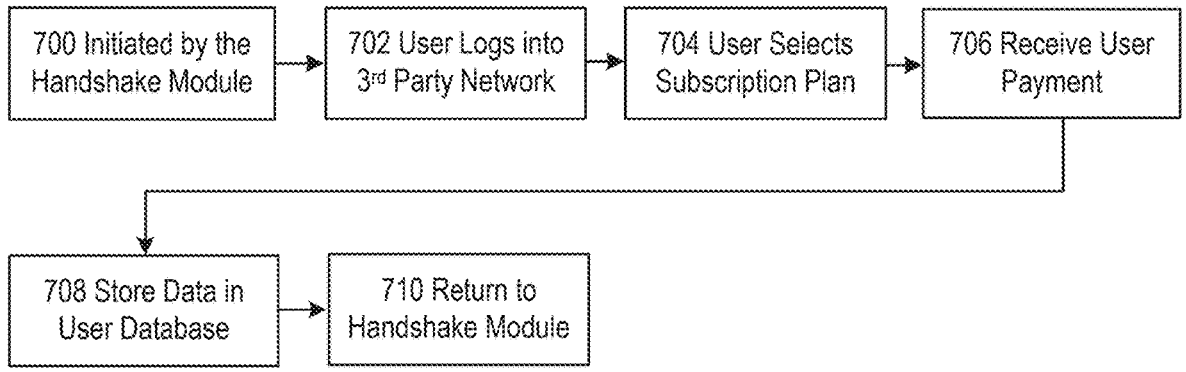
FIG. 7 is a flowchart of a method performed by a Subscription Module, according to an embodiment.
FIG. 8 is a flowchart of a method performed by a User Database, according to an embodiment.
FIG. 9 is a flowchart of a method performed by a Material Database, according to an embodiment.

FIG. 7 illustrates the subscription module 168. The process begins with the subscription module 168 being initiated at step 700 by the handshake module 166. In some embodiments, the subscription module 168 may be initiated if the user does not have a current subscription plan for the 3rd party network 164. In some embodiments, the subscription plans may allow a user to download a certain number of modular antenna 138 data packets, such as a basic plan allows for four data packets to be downloaded, a premium plan allows for ten data packets to be downloaded, a platinum plan allows for twenty data packets to be downloaded, etc. In some embodiments, once a modular antenna 138 data packet is downloaded, the data is stored in the user database 170 to allow the user to re-download the data packet associated with the modular antenna 138 again. The user logs in, at step 702, to the 3rd party network 164. The login process may involve entering credentials such as a username and password. The 3rd party network 164 may also employ additional security measures like two-factor authentication to enhance security. Once authenticated, the user gains access to their account and the available services. The user selects, at step 704, the subscription plan.

Within the 3rd party network 164 interface, the user navigates to the subscription section to choose a suitable plan. In some embodiments, the 3rd party network 164 may offer various subscription tiers, each providing different levels of access to data packets and features. The subscription module 168 receives, at step 706, the user payment. After selecting a subscription plan, the user proceeds to the payment section. In some embodiments, the subscription module 168 may handle the payment process, which involves entering payment details such as credit card information or using an integrated payment service like PayPal. In some embodiments, the subscription module 168 may securely process the payment, ensuring compliance with industry standards for payment security and user data protection. The subscription module 168 stores, at step 708, the subscription data in the user database 170. The user database 170 may include a plurality of user IDs, which may allow each user to be uniquely identified and serve as the primary key for accessing and managing individual user records. The user database 170 may include a subscription plan for each user and categorize each user based on the level of access granted to modular antennas 138 and associated detection capabilities. In some embodiments, the subscription plans may vary from basic to premium tiers, each offering distinct privileges regarding the number and type of antennas accessible to the user. The subscription module 168 returns, at step 710, to the handshake module 166.

FIG. 8 illustrates the user database 170. The user database 170 may store information about users who subscribe to services related to antenna access and detection capabilities. The user database 170 maintains a structured repository of user profiles, enabling efficient management of subscription plans and user-specific configurations. The user database 170 may include a plurality of user IDs, which may allow each user to be uniquely identified and serve as the primary key for accessing and managing individual user records. The user database 170 may include a subscription plan for each user and categorize each user based on the level of access granted to modular antennas 138 and associated detection capabilities. In some embodiments, the subscription plans may vary from basic to premium tiers, each offering distinct privileges regarding the number and type of antennas accessible to the user. The user database 170 may include a plurality of modular antennas 138 that the user has registered to their subscription plan to ensure that the users have access to the appropriate data needed for detecting target materials effectively. In some embodiments, the user database 170 may support secure user authentication mechanisms, validating user credentials before granting access to detection functionalities and antenna resources. For example, a user with a Premium subscription plan may have access to multiple modular antennas 138 data that allows them to detect a broader range of target materials. Conversely, a user on a Basic plan may be limited to fewer antennas. The database dynamically adjusts access permissions based on the user's plan, ensuring efficient resource allocation and optimized detection capabilities.

FIG. 9 illustrates the material database 172. The material database 172 may contain information about target materials and their corresponding detection parameters. The material database 172 may facilitate efficient management and retrieval of data useful for identifying and analyzing detected materials based on their electromagnetic responses. The material database 172 may contain a modular antenna 138 ID, a target material or substance, and a data packet that contains the parameters for each of the modular antenna 138. Each modular antenna 138 deployed in the RF detection system 100 may be uniquely identified by an antenna ID, which links the modular antenna 138 to specific detection capabilities and configurations. The material database 172 may categorize various substances and materials that the RF detection device 102 is designed to identify. In some embodiments, the substances and materials may include specific elements from the periodic table and other materials of interest, such as drugs, biohazardous substances, or specific molecular structures relevant to detection tasks. For example, the substances and materials may be gold, iron, copper, nitrogen-based compounds, explosive residues, drugs such as marijuana, cocaine, heroin, biological agents, cancerous tissues, etc. Each entry in the material database 172 may include a data packet associated with the detected material. This packet contains detailed information about the material's electromagnetic characteristics, response patterns, and additional metadata such as file names or timestamps. For example, a data packet for gold may include resonance frequencies, signal strengths, and specific electromagnetic signatures characteristic of gold. A data packet for drugs may include spectral analysis results showing unique electromagnetic responses indicative of drug presence. In some embodiments, the material database 172 may support the configuration and calibration of detection parameters based on the electromagnetic properties of target materials and allow for the optimization of detection algorithms and signal-processing techniques tailored to specific substances. In some embodiments, the material database 172 may facilitate real-time updates and synchronization with the RF detection device 102, ensuring that new material profiles and detection methodologies are promptly integrated. In some embodiments, the material database 172 may serve as a repository for storing historical detection data and analysis results. In some embodiments, the material database 172 may include detection parameters uploaded by other users of the 3rd party network 164, allowing other members or users of the 3rd party network 164 to purchase and use the uploaded detection parameters for specific target materials. In some embodiments, the material database 172 may contain parameter data for the modular transmitter unit 106 and/or modular receiver unit 122. For example, if the modular antenna 138 operates at a lower frequency, like 50 Hz, the transmitter unit 106 might emphasize power amplification and precise frequency tuning, while the receiver unit 122 prioritizes low-noise reception and accurate signal demodulation. Conversely, for higher frequencies or different modulation schemes required by other modular antennas, these units can be adapted to suit those specific needs.

FIG. 10 illustrates an example embodiment of two modular antennas 138.

The table illustrated in FIG. 10 provides an example of the differences between two modular antennas 138, which may be used to detect different target materials. For example, the two modular antennas 138 may operate at different frequencies, such as operating at 50 Hz and 300 Hz frequencies. The design considerations for each modular antenna 138 may include various technical parameters such as wavelength, modular antenna 138 type, core material, number of turns, coil dimensions, inductance, capacitance, impedance matching, grounding and shielding requirements, physical size, environmental stability, signal loss minimization, material selection, and testing and optimization processes. The wavelength of the electromagnetic signal may vary depending on the frequency used and the target material's characteristics. For example, 50 Hz frequencies may have wavelengths as long as 6,000,000 meters, whereas 300 Hz frequencies may have shorter wavelengths around 1,000,000 meters. The difference in wavelength affects the physical size of the modular antenna 138 required for efficient signal transmission and reception. Longer wavelengths necessitate larger antennas, whereas shorter wavelengths allow for more compact designs that can still achieve effective detection. The type of modular antenna 138 type may vary based on the specific detection needs and operational requirements. In some embodiments, modular antenna 138 types may include magnetic loop antennas, inductive coils, dipole antennas, Yagi-Uda antennas, patch antennas, log-periodic antennas, helical antennas, and parabolic reflector antennas. Magnetic loop antennas and inductive coils may be suitable for detecting substances like drugs or cancer cells based on their molecular resonances. In some embodiments, the type of antenna may offer unique benefits, such as magnetic loops for their simplicity and versatility in varying environments, while Yagi-Uda antennas may provide high directionality for focused detection tasks. The core material of a modular antenna 138, such as ferrite or specialized magnetic alloys, may determine its inductance, efficiency, and frequency response. For example, ferrite cores may have high permeability and the ability to concentrate magnetic flux, making them suitable for applications requiring precise detection of specific substances. In some embodiments, the core material may depend on factors such as desired operating frequency, environmental conditions, and magnetic properties necessary to optimize the modular antenna's 138 performance. The number of turns in an antenna coil may affect its inductance and resonant frequency. For example, a higher number of turns, such as 45 turns, may be used for modular antennas 138 operating at lower frequencies like 50 Hz, where longer wavelengths may require increased inductance for effective signal reception. Modular antennas 138 designed for higher frequencies, such as 300 Hz, may require fewer turns, such as 14 turns, to achieve optimal resonance and efficiency. The dimensions of the modular antenna 138 coils, including its diameter and length, may determine its performance and application suitability. For example, modular antennas 138 with a larger coil diameter of 0.5 meters may be common in low-frequency applications like 50 Hz, where physical size is less restrictive due to longer wavelengths. Modular antennas 138 operating at higher frequencies, such as 300 Hz, may utilize smaller coil dimensions to maintain compactness while still achieving adequate signal reception. Coil dimensions may be optimized to balance between wavelength requirements, modular antenna 138 sensitivity, and practical deployment considerations. The inductance may be determined by the number of turns and core material and influence the modular antenna's ability to resonate at specific frequencies. Modular antennas 138 designed for 50 Hz may require higher inductance, such as 10 H, to match the longer wavelength and achieve efficient signal transmission and reception. Modular antennas 138 operating at 300 Hz may require lower inductance, such as 1 H, due to the shorter wavelength, allowing for reduced coil complexity and improved efficiency in detecting molecular resonances of target substances. Capacitance values in the modular antennas 138 may vary depending on the desired resonant frequency and coil characteristics. For example, modular antennas 138 tuned to 50 Hz frequencies may require higher capacitance, such as 10.1 μF, to achieve resonance with the inductance and maintain signal integrity over longer wavelengths. At 300 Hz frequencies, modular antennas 138 may utilize lower capacitance values, such as 0.28 μF, to optimize efficiency and reduce potential interference from external sources. In some embodiments, modular antenna 138 designed for different frequencies and applications may require specific matching networks tailored to their impedance characteristics. For example, low-frequency modular antennas 138, such as those operating at 50 Hz, may utilize matching networks designed for high inductance and impedance matching to minimize reflection and ensure efficient signal transmission. Modular antennas 138 operating at higher frequencies, such as 300 Hz, may require moderate impedance matching networks that balance signal fidelity and system performance across a broader frequency range. In some embodiments, modular antenna 138 designed for sensitive applications, such as medical diagnostics or environmental monitoring, may require robust grounding and shielding measures. For example, modular antennas 138 operating at 50 Hz frequencies may require effective grounding and shielding to mitigate power line interference and external noise sources to ensure accurate detection of target substances. Modular antennas 138 operating at 300 Hz frequencies may incorporate shielding techniques to reduce RF noise and maintain signal clarity to enhance reliability and performance in diverse operational environments. In some embodiments, the physical size of a modular antenna 138 may be influenced by its operating frequency, wavelength, and application requirements. Modular antenna 138 designed for low frequencies such as 50 Hz may have larger physical dimensions due to longer wavelengths and higher inductance requirements. The larger size may facilitate effective signal transmission and reception but may limit portability and deployment flexibility. Modular antennas 138 designed for higher frequencies like 300 Hz may be more compact while still achieving adequate performance, making them suitable for applications requiring smaller form factors and ease of installation in constrained spaces. In some embodiments, the modular antennas 138 may be able to withstand factors such as temperature fluctuations, humidity levels, and exposure to contaminants without compromising detection accuracy. For example, modular antennas 138 may be designed for outdoor applications or industrial settings through materials and construction methods that resist corrosion, moisture ingress, and physical wear, ensuring long-term performance and operational longevity. In some embodiments, modular antennas 138 designed for low-frequency applications such as 50 Hz may prioritize minimizing signal loss due to longer wavelengths and potential attenuation over distance, which may involve using high-quality conductive materials, low-loss dielectrics, and efficient transmission line designs to preserve signal integrity. At higher frequencies, such as 300 Hz, signal loss minimization may be less critical than at lower frequencies, allowing for optimized modular antenna 138 designs that may balance performance, efficiency, and cost-effectiveness in detecting specific materials or conditions. The material used for the modular antenna's 138 design may include conductive materials with low resistance and appropriate electromagnetic properties. For example, modular antennas 138 designed for medical applications may use biocompatible materials that ensure compatibility with biological tissues and medical devices. Modular antennas 138 used in industrial or environmental monitoring applications may require materials resistant to chemical exposure, moisture, and physical damage. In some embodiments, testing and optimization processes may be used to validate the modular antenna's 138 performance and ensure compliance with design specifications. Modular antenna 138 designed for different frequencies may undergo testing using specialized equipment such as antenna analyzers, network analyzers, and spectrum analyzers. For example, modular antennas 138 tuned to 50 Hz frequencies may be tested to verify resonance, impedance matching, and signal efficiency across the desired frequency range. Modular antennas 138 designed for 300 Hz frequencies may undergo testing to assess bandwidth, radiation pattern, and electromagnetic compatibility to optimize performance for specific detection applications. For example, if a user goal is to detect cancer cells using an RF detection device 102 equipped with a modular antenna 138 operating at a target frequency of 50 Hz, the modular antenna 138 would be designed with approximately 45 turns wound around a high permeability ferrite core. The modular antenna 138 may feature a diameter of 0.5 meters and a length of 0.1 meters, achieving an inductance of 10 H and a capacitance of 10.1 µF for optimal signal resonance. Grounding and shielding would be implemented to minimize power line interference, ensuring reliable performance in diverse field conditions. If the target frequency is 300 Hz for detecting specific drugs, the modular antenna 138 may have around 14 turns, the same diameter and length as the 50 Hz modular antenna 138, but with an inductance of 1 H and a capacitance of 0.28 µF. The grounding and shielding may focus on minimizing RF noise, and the design would be more compact due to the higher frequency requirements.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The invention claimed is:

1. A radio frequency (RF)-based material detection device comprising:
   a first interchangeable antenna releasably coupled to an antenna connector;
   an RF transmitter unit operably coupled to the antenna connector and that transmits an RF signal via the first interchangeable antenna into a first material at a specific resonance frequency for the first material; and
   an RF receiver unit operably coupled to the antenna connector and that receives from the first material via the first interchangeable antenna a first modified signal in response to interaction of the RF signal with the first material,
   wherein the first interchangeable antenna includes one or more design characteristics that enhance detection of the first modified signal from the first material.

2. The RF-based material detection device of claim 1, further comprising a second interchangeable antenna releasably coupled to the antenna connector, wherein the RF transmitter unit transmits an RF signal via the second interchangeable antenna into a second material at a specific resonance frequency for the second material, and the RF receiver unit receives from the second material via the second interchangeable antenna a second modified signal in response to interaction of the RF signal with the second material, the second interchangeable antenna including one or more design characteristics that enhance detection of the second modified signal from the second material.

3. The RF-based material detection device of claim 2, wherein the antenna connector is standardized to interface with respective connectors of the first interchangeable antenna and the second interchangeable antenna.

4. The RF-based material detection device of claim 2, wherein the first interchangeable antenna and the second interchangeable antenna are each releasably coupled to the antenna connector at different times.

5. The RF-based material detection device of claim 2, further comprising a second antenna connector, wherein a second interchangeable antenna is releasably coupled to the second antenna connector, and wherein the RF transmitter unit transmits an RF signal via the second interchangeable antenna into a second material at a specific resonance frequency for the second material, and the RF receiver unit receives from the second material via the second interchangeable antenna a second modified signal in response to interaction of the RF signal with the second material, the second interchangeable antenna including one or more design characteristics that enhance detection of the second modified signal from the second material.

6. The RF-based material detection device of claim 1, wherein the one or more design characteristics include one or more of shape, physical dimensions, materials, and electrical properties.

7. The RF-based material detection device of claim 1, further comprising one or more modular antenna elements or one or more amplifiers that enhance a signal-to-noise ratio for the first modified signal from the first material.

8. The RF-based material detection device of claim 1, wherein the antenna connector includes a directional shield that blocks electromagnetic radiation in a specific direction.

9. The RF-based material detection device of claim 1, further comprising a material database that stores associations between resonance frequencies and particular materials, wherein the RF transmitter unit selects the specific resonance frequency for the RF signal based on one of the stored associations between resonance frequencies to particular materials in accordance with the material database.

10. The RF-based material detection device of claim 1, wherein the first interchangeable antenna is impedance matched with one or both of the RF transmitter unit and the RF receiver unit.

11. A radio frequency (RF)-based method for material detection, the method comprising:
  transmitting, via an RF transmitter unit operably coupled to a first interchangeable antenna releasably coupled via an antenna connector, an RF signal into a first material at a specific resonance frequency for the first material; and
  receiving, from the first material via an RF receiver unit operably coupled to the first interchangeable antenna via the antenna connector, a first modified signal in response to interaction of the RF signal with the first material,
  wherein transmitting the specific resonance frequency is enhanced by one or more design characteristics of the first interchangeable antenna.

12. The RF-based method for material detection of claim 11, further comprising:
  transmitting, via the RF transmitter unit operably coupled to a second interchangeable antenna, an RF signal into a second material at a specific resonance frequency for the second material; and
  receiving, via the RF receiver unit operably coupled to the second interchangeable antenna, a second modified signal in response to interaction of the RF signal with the second material, wherein the transmission of the specific resonance frequency for the second material is enhanced using one or more design characteristics of the second interchangeable antenna.

13. The RF-based method for material detection of claim 12, further comprising switching between the first interchangeable antenna and the second interchangeable antenna using the antenna connector at different times.

14. The RF-based method for material detection of claim 11, further comprising enhancing signal-to-noise ratio for the first modified signal from the first material using one or more modular antenna elements.

15. The RF-based method for material detection of claim 11, further comprising blocking electromagnetic radiation in a specific direction using a directional shield in conjunction with the antenna connector.

16. The RF-based method for material detection of claim 11, further comprising checking a material database that stores associations between resonance frequencies and particular materials, and configuring the RF transmitter unit to select the specific resonance frequency for the RF signal based on one of the stored associations between resonance frequencies to particular materials in accordance with the material database.

17. The RF-based method for material detection of claim 11, further comprising impendence matching the first interchangeable antenna with one or both of the RF transmitter unit and the RF receiver unit.

18. The RF-based method for material detection of claim 11, further comprising enhancing a signal-to-noise ratio for the first modified signal from the first material using an amplifier.

* * * * *